(12) United States Patent
Medlock et al.

(10) Patent No.: US 10,073,829 B2
(45) Date of Patent: *Sep. 11, 2018

(54) SYSTEM AND METHOD FOR INPUTTING TEXT INTO ELECTRONIC DEVICES

(71) Applicant: TouchType Ltd., London (GB)

(72) Inventors: Benjamin William Medlock, London (GB); Jonathan Paul Reynolds, London (GB)

(73) Assignee: TOUCHTYPE LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,028

(22) Filed: Apr. 20, 2017

(65) Prior Publication Data

US 2017/0220552 A1   Aug. 3, 2017

Related U.S. Application Data

(63) Continuation of application No. 13/262,190, filed as application No. PCT/GB2010/000622 on Mar. 30, 2010, now Pat. No. 9,659,002.

(30) Foreign Application Priority Data

Mar. 30, 2009   (GB) .................................. 0905457.8

(51) Int. Cl.
*G06F 17/27* (2006.01)
*G06F 3/00* (2006.01)
(Continued)

(52) U.S. Cl.
CPC .......... *G06F 17/276* (2013.01); *G06F 3/0237* (2013.01); *G06F 3/0482* (2013.01); *G06F 3/04817* (2013.01); *G06F 3/04886* (2013.01)

(58) Field of Classification Search
CPC ............................ G06F 17/276; G06F 3/0237
See application file for complete search history.

(56) References Cited

U.S. PATENT DOCUMENTS 5,467,425 A   11/1995   Lau et al.
5,477,451 A   12/1995   Brown et al.
(Continued)

FOREIGN PATENT DOCUMENTS

CN   1703664 A    11/2005
CN   101034390 A   9/2007
(Continued)

OTHER PUBLICATIONS

"Ai.Type keyboard Free + Emoji", Retrieved from <<https://web.archive.org/web/20150905230845/https://play.google.com/store/apps/details?id=com.aitype.android>>, May 20, 2015, 31 Pages.
(Continued)

*Primary Examiner* — Jialong He
(74) *Attorney, Agent, or Firm* — Schwegman Lundberg & Woessner, P.A.

(57) ABSTRACT

The present invention provides a system comprising a user interface configured to receive text input by a user, a text prediction engine comprising a plurality of language models and configured to receive the input text from the user interface and to generate concurrently text predictions using the plurality of language models, and wherein the text prediction engine is further configured to provide text predictions to the user interface for display and user selection. An analogous method and an interface for use with the system and method are also provided.

19 Claims, 14 Drawing Sheets

(51) Int. Cl.
*G06F 3/023* (2006.01)
*G06F 3/0488* (2013.01)
*G06F 3/0482* (2013.01)
*G06F 3/0481* (2013.01)

(56) References Cited

U.S. PATENT DOCUMENTS

| | | | |
|---|---|---|---|
| 5,612,690 A | 3/1997 | Levy | |
| 5,671,426 A | 9/1997 | Armstrong, III | |
| 5,680,511 A | 10/1997 | Baker et al. | |
| 5,768,603 A | 6/1998 | Brown et al. | |
| 5,797,098 A | 8/1998 | Schroeder et al. | |
| 5,805,832 A | 9/1998 | Brown et al. | |
| 5,805,911 A | 9/1998 | Miller | |
| 5,806,021 A | 9/1998 | Chen et al. | |
| 5,896,321 A | 4/1999 | Miller et al. | |
| 5,952,942 A | 9/1999 | Balakrishnan et al. | |
| 5,963,671 A | 10/1999 | Comerford et al. | |
| 6,009,444 A | 12/1999 | Chen | |
| 6,011,554 A | 1/2000 | King et al. | |
| 6,052,657 A | 4/2000 | Yamron et al. | |
| 6,054,941 A | 4/2000 | Chen | |
| 6,104,989 A | 8/2000 | Kanevsky et al. | |
| 6,125,342 A | 9/2000 | Selesky | |
| 6,167,377 A | 12/2000 | Gillick et al. | |
| 6,182,027 B1 | 1/2001 | Nasukawa et al. | |
| 6,204,848 B1 | 3/2001 | Nowlan et al. | |
| 6,219,632 B1 | 4/2001 | Schumacher et al. | |
| 6,236,958 B1 | 5/2001 | Lange et al. | |
| 6,253,169 B1 | 6/2001 | Apte et al. | |
| 6,275,792 B1 | 8/2001 | Lewis | |
| 6,286,064 B1 | 9/2001 | King et al. | |
| 6,307,548 B1 | 10/2001 | Flinchem et al. | |
| 6,307,549 B1 | 10/2001 | King et al. | |
| 6,321,192 B1 | 11/2001 | Houchin et al. | |
| 6,327,561 B1 | 12/2001 | Smith et al. | |
| 6,362,752 B1 | 3/2002 | Guo et al. | |
| 6,377,965 B1 | 4/2002 | Hachamovitch et al. | |
| 6,393,399 B1 | 5/2002 | Even | |
| 6,405,060 B1 | 6/2002 | Schroeder et al. | |
| 6,460,015 B1 | 10/2002 | Hetherington et al. | |
| 6,484,136 B1 | 11/2002 | Kanevsky et al. | |
| 6,490,549 B1 | 12/2002 | Ulicny et al. | |
| 6,519,557 B1 | 2/2003 | Emens et al. | |
| 6,523,134 B2 | 2/2003 | Korenshtein | |
| 6,573,844 B1 | 6/2003 | Venolia et al. | |
| 6,625,600 B2 | 9/2003 | Lyudovyk et al. | |
| 6,671,670 B2 | 12/2003 | Levin et al. | |
| 6,724,936 B1 | 4/2004 | Riemer | |
| 6,778,958 B1 | 8/2004 | Nishimura et al. | |
| 6,813,616 B2 | 11/2004 | Simpson et al. | |
| 6,901,364 B2 | 5/2005 | Nguyen et al. | |
| 6,911,608 B2 | 6/2005 | Levy | |
| 6,917,910 B2 | 7/2005 | Itoh et al. | |
| 6,925,433 B2 | 8/2005 | Stensmo | |
| 6,963,831 B1 | 11/2005 | Epstein | |
| 6,965,856 B1 | 11/2005 | Stuermer | |
| 6,993,476 B1 | 1/2006 | Dutta et al. | |
| 7,075,520 B2 | 7/2006 | Williams | |
| 7,092,870 B1 | 8/2006 | Chen et al. | |
| 7,098,896 B2 | 8/2006 | Kushler et al. | |
| 7,129,932 B1 | 10/2006 | Klarlund et al. | |
| 7,175,438 B2 | 2/2007 | Levy | |
| 7,187,365 B2 | 3/2007 | Harman | |
| 7,218,249 B2 | 5/2007 | Chadha | |
| 7,222,067 B2 | 5/2007 | Glushnev et al. | |
| 7,251,367 B2 | 7/2007 | Zhai | |
| 7,269,546 B2 | 9/2007 | Stensmo | |
| 7,366,666 B2 | 4/2008 | Balchandran et al. | |
| 7,395,081 B2 | 7/2008 | Bonnelykke Kristensen et al. | |
| 7,426,505 B2 | 9/2008 | Simpson et al. | |
| 7,453,439 B1 | 11/2008 | Kushler et al. | |
| 7,475,010 B2 | 1/2009 | Chao | |
| 7,487,461 B2 | 2/2009 | Zhai et al. | |
| 7,562,016 B2 | 7/2009 | Balchandran et al. | |
| 7,580,829 B2 | 8/2009 | James et al. | |
| 7,610,189 B2 | 10/2009 | MacKie | |
| 7,610,191 B2 | 10/2009 | Gao et al. | |
| 7,706,616 B2 | 4/2010 | Kristensson et al. | |
| 7,720,682 B2 | 5/2010 | Stephanick et al. | |
| 7,750,891 B2 | 7/2010 | Stephanick et al. | |
| 7,809,575 B2 | 10/2010 | Ativanichayaphong et al. | |
| 7,814,088 B2 | 10/2010 | Simpson et al. | |
| 7,843,427 B2 | 11/2010 | Ording et al. | |
| 7,900,142 B2 | 3/2011 | Baer | |
| 7,904,298 B2 | 3/2011 | Rao | |
| 7,912,700 B2 | 3/2011 | Bower et al. | |
| 7,920,132 B2 | 4/2011 | Longe et al. | |
| 7,953,692 B2 | 5/2011 | Bower et al. | |
| 7,996,211 B2 | 8/2011 | Gao et al. | |
| 8,010,343 B2 | 8/2011 | Agapi et al. | |
| 8,032,358 B2 | 10/2011 | Helletzgruber et al. | |
| 8,036,878 B2 * | 10/2011 | Assadollahi | G06F 3/0237 704/10 |
| 8,073,698 B2 | 12/2011 | Ativanichayaphong et al. | |
| 8,074,172 B2 | 12/2011 | Kocienda et al. | |
| 8,117,144 B2 | 2/2012 | Angell et al. | |
| 8,136,050 B2 | 3/2012 | Sacher et al. | |
| 8,200,487 B2 | 6/2012 | Peters et al. | |
| 8,225,203 B2 | 7/2012 | Unruh | |
| 8,232,973 B2 | 7/2012 | Kocienda et al. | |
| 8,289,283 B2 | 10/2012 | Kida et al. | |
| 8,299,943 B2 | 10/2012 | Longe | |
| 8,516,367 B2 | 8/2013 | Archer | |
| 8,605,039 B2 | 12/2013 | Danielsson et al. | |
| 8,713,432 B2 | 4/2014 | Assadollahi | |
| 8,756,527 B2 | 6/2014 | Paasovaara | |
| 8,812,972 B2 | 8/2014 | Bangalore | |
| 9,424,246 B2 | 8/2016 | Spencer et al. | |
| 2002/0045463 A1 | 4/2002 | Chen et al. | |
| 2002/0077808 A1 * | 6/2002 | Liu | G06F 3/0237 704/10 |
| 2002/0091520 A1 | 7/2002 | Endo et al. | |
| 2002/0111806 A1 | 8/2002 | Franz et al. | |
| 2002/0126097 A1 | 9/2002 | Savolainen | |
| 2002/0156627 A1 | 10/2002 | Itoh et al. | |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0046073 A1 | 3/2003 | Mori et al. | |
| 2003/0073451 A1 * | 4/2003 | Kraft | G06F 3/0237 455/466 |
| 2003/0093263 A1 | 5/2003 | Chen et al. | |
| 2003/0182279 A1 * | 9/2003 | Willows | G06F 3/0237 |
| 2003/0234821 A1 | 12/2003 | Pugliese | |
| 2004/0083198 A1 | 4/2004 | Bradford et al. | |
| 2004/0136564 A1 | 7/2004 | Roeber et al. | |
| 2004/0153975 A1 * | 8/2004 | Williams | G06F 17/276 715/256 |
| 2004/0201607 A1 | 10/2004 | Mulvey et al. | |
| 2004/0243393 A1 | 12/2004 | Wang | |
| 2005/0044495 A1 * | 2/2005 | Lee | G06F 17/2223 715/257 |
| 2005/0060138 A1 * | 3/2005 | Wang | G06F 3/018 704/1 |
| 2005/0114770 A1 | 5/2005 | Sacher et al. | |
| 2005/0162395 A1 | 7/2005 | Unruh | |
| 2005/0190970 A1 | 9/2005 | Griffin | |
| 2005/0200609 A1 | 9/2005 | Van der Hoeven | |
| 2005/0270270 A1 | 12/2005 | Chadha | |
| 2005/0283724 A1 * | 12/2005 | Griffin | G06F 17/2735 715/259 |
| 2006/0036428 A1 | 2/2006 | Ramsey | |
| 2006/0047498 A1 * | 3/2006 | Fux | G06F 17/289 704/3 |
| 2006/0142997 A1 * | 6/2006 | Jakobsen | G06F 3/0237 704/10 |
| 2006/0206313 A1 | 9/2006 | Xu et al. | |
| 2006/0217144 A1 | 9/2006 | Bonnelykke Kristensen et al. | |
| 2006/0247915 A1 * | 11/2006 | Bradford | G06F 3/0481 704/1 |

(56) References Cited

U.S. PATENT DOCUMENTS

| | | | |
|---|---|---|---|
| 2006/0265208 A1* | 11/2006 | Assadollahi | G06F 3/0237 704/9 |
| 2006/0265648 A1 | 11/2006 | Rainisto et al. | |
| 2006/0274051 A1 | 12/2006 | Longe et al. | |
| 2006/0290535 A1 | 12/2006 | Thiesson et al. | |
| 2007/0016572 A1 | 1/2007 | Bates et al. | |
| 2007/0033002 A1 | 2/2007 | Dymetman et al. | |
| 2007/0046641 A1 | 3/2007 | Lim | |
| 2007/0061753 A1 | 3/2007 | Ng et al. | |
| 2007/0074131 A1* | 3/2007 | Assadollahi | G06F 3/0237 715/816 |
| 2007/0076862 A1 | 4/2007 | Chatterjee et al. | |
| 2007/0088729 A1 | 4/2007 | Baca et al. | |
| 2007/0094024 A1 | 4/2007 | Kristensson et al. | |
| 2007/0155369 A1 | 7/2007 | Jobs et al. | |
| 2007/0157122 A1* | 7/2007 | Williams | G06F 3/0237 715/816 |
| 2007/0247436 A1 | 10/2007 | Jacobsen | |
| 2008/0040099 A1* | 2/2008 | Wu | G06F 17/275 704/9 |
| 2008/0076472 A1* | 3/2008 | Hyatt | G06F 3/0237 455/557 |
| 2008/0077406 A1* | 3/2008 | Ganong, III | G10L 15/22 704/251 |
| 2008/0091412 A1 | 4/2008 | Strope et al. | |
| 2008/0126075 A1* | 5/2008 | Thorn | G06F 3/0237 704/3 |
| 2008/0162113 A1* | 7/2008 | Dargan | G06F 17/276 704/3 |
| 2008/0168366 A1 | 7/2008 | Kocienda et al. | |
| 2008/0189605 A1 | 8/2008 | Kay et al. | |
| 2008/0195374 A1 | 8/2008 | Holubar et al. | |
| 2008/0195388 A1* | 8/2008 | Bower | G06F 3/0237 704/243 |
| 2008/0195571 A1 | 8/2008 | Furuuchi et al. | |
| 2008/0281583 A1 | 11/2008 | Slothouber et al. | |
| 2008/0282154 A1 | 11/2008 | Nurmi | |
| 2008/0285857 A1 | 11/2008 | Sharan et al. | |
| 2008/0291059 A1 | 11/2008 | Longe | |
| 2008/0294982 A1 | 11/2008 | Leung et al. | |
| 2008/0310723 A1* | 12/2008 | Manu | G06F 3/0237 382/182 |
| 2008/0312910 A1* | 12/2008 | Zhang | G06F 17/2735 704/10 |
| 2009/0006101 A1 | 1/2009 | Rigazio et al. | |
| 2009/0009367 A1 | 1/2009 | Hirshberg | |
| 2009/0019002 A1* | 1/2009 | Boulis | G06F 17/30867 |
| 2009/0058690 A1* | 3/2009 | Scott | G06F 3/0202 341/23 |
| 2009/0058813 A1 | 3/2009 | Rubanovich et al. | |
| 2009/0106695 A1* | 4/2009 | Perry | G06F 17/24 715/816 |
| 2009/0150322 A1 | 6/2009 | Bower et al. | |
| 2009/0187846 A1 | 7/2009 | Paasovaara | |
| 2009/0193334 A1 | 7/2009 | Assadollahi | |
| 2009/0210214 A1* | 8/2009 | Qian | G06F 17/289 704/2 |
| 2009/0225041 A1* | 9/2009 | Kida | G06F 3/0237 345/173 |
| 2009/0249198 A1 | 10/2009 | Davis et al. | |
| 2009/0271195 A1 | 10/2009 | Kitade et al. | |
| 2009/0284471 A1 | 11/2009 | Longe et al. | |
| 2009/0313572 A1 | 12/2009 | Paek et al. | |
| 2010/0017393 A1 | 1/2010 | Broicher et al. | |
| 2010/0031143 A1 | 2/2010 | Rao et al. | |
| 2010/0106740 A1 | 4/2010 | Kawauchi | |
| 2010/0121870 A1 | 5/2010 | Unruh et al. | |
| 2010/0161318 A1* | 6/2010 | Lowles | G06F 1/1626 704/10 |
| 2010/0171700 A1 | 7/2010 | Sharan et al. | |
| 2010/0199176 A1 | 8/2010 | Chronqvist | |
| 2010/0218141 A1 | 8/2010 | Xu et al. | |
| 2010/0225599 A1 | 9/2010 | Danielsson et al. | |
| 2010/0283736 A1 | 11/2010 | Akabane et al. | |
| 2011/0029862 A1 | 2/2011 | Scott et al. | |
| 2011/0047456 A1 | 2/2011 | Sharan et al. | |
| 2011/0074685 A1 | 3/2011 | Causey et al. | |
| 2011/0179032 A1 | 7/2011 | Ceusters et al. | |
| 2011/0202836 A1 | 8/2011 | Badger et al. | |
| 2012/0010875 A1 | 1/2012 | Helletzgruber et al. | |
| 2012/0029910 A1 | 2/2012 | Medlock et al. | |
| 2012/0167009 A1 | 6/2012 | Davidson et al. | |
| 2015/0186362 A1 | 7/2015 | Li et al. | |

FOREIGN PATENT DOCUMENTS

| | | |
|---|---|---|
| CN | 101203849 A | 6/2008 |
| CN | 101329614 A | 12/2008 |
| CN | 101496036 A | 7/2009 |
| EP | 872801 A2 | 10/1998 |
| EP | 1724692 A2 | 11/2006 |
| EP | 2088536 A1 | 8/2009 |
| GB | 2443652 A | 5/2008 |
| WO | 2001050335 A1 | 7/2001 |
| WO | 2008116843 A2 | 10/2008 |
| WO | 2008120033 A1 | 10/2008 |

OTHER PUBLICATIONS

"Final Office Action Issued in U.S. Appl. No. 13/262,190", dated May 15, 2015, 16 Pages.

"Final Office Action Issued in U.S. Appl. No. 13/262,190", dated Nov. 4, 2016, 13 Pages.

"Final Office Action Issued in U.S. Appl. No. 13/262,190", dated Feb. 12, 2016, 13 Pages.

"Non Final Office Action Issued in U.S. Appl. No. 13/262,190", dated Oct. 26, 2015, 12 Pages.

"Non Final Office Action Issued in U.S. Appl. No. 13/262,190", dated Jul. 18, 2016, 12 Pages.

"Non Final Office Action Issued in U.S. Appl. No. 13/262,190", dated Jan. 22, 2015, 22 Pages.

"Notice of Allowance Issued in U.S. Appl. No. 13/262,190", dated Jan. 19, 2017, 15 Pages.

Frederico, Marcello, "Bayesian Estimation Methods for N-Gram Language Model Adaptation", In Proceedings of the Fourth International Conference on Spoken Language, Oct. 3, 1996, 4 Pages.

"Final Office Action issued in U.S. Appl. No. 14/452,887", dated Mar. 13, 2015, 45 Pages.

"Final Office Action Issued in U.S. Appl. No. 14/452,887", dated Sep. 8, 2016, 52 Pages.

"Non Final Office Action Issued in U.S. Appl. No. 14/452,887", dated May 6, 2016, 47 Pages.

"Non Final Office Action Issued in U.S. Appl. No. 14/452,887", dated Nov. 5, 2014, 40 Pages.

How, et al., "Optimizing Predictive Text Entry for Short Message Service on Mobile Phones", In Proceedings of International Conference on Hybrid Information Technology, vol. 5, Jul. 2005, 10 Pages.

Silfverberg, et al., "Predicting Text Entry Speed on Mobile Phones", In Proceedings of the SIGCHI Conference on Human Factors in Computing Systems, Apr. 1, 2000, pp. 9-16.

"Search Report Issued in European Patent Application No. 15155451.6", dated May 12, 2015, 3 Pages.

Bellegarda, Jerome R., "Statistical Language Model Adaptation: Review and Perspectives", In Proceedings of the Speech Communication, vol. 42, Issue 01, Jan. 31, 2004, pp. 93-108.

Bosch, et al., "Efficient Context-Sensitive Word Completion for Mobile Devices", In Proceedings of the 10th International Conference on Human Computer Interaction with Mobile Devices and Services, Sep. 2, 2008, pp. 465-470.

Christine, "Cupcake Adds Camcorder, Touchscreen Keyboard, and More to Android", Retrieved from <<http://smarterware.org/2009/05/cupcake-adds-video-camera-touchscreen-keyboard-and-more-to-android/>>, May 27, 2009, 5 Pages.

Federico, Marcello, "Efficient Language Model Adaptation Through MDI Estimation", In Proceedings of Eurospeech, Sep. 1999, 4 Pages.

(56) References Cited

OTHER PUBLICATIONS

Florian, et al., "Dynamic Nonlocal Language Modeling via Hierarchical Topic-Based Adaptation", In Proceedings of the 37th Annual Meeting of the Association for Computational Linguistics on Computational Linguistics, Jun. 20, 1999, 9 Pages.

U.S. Appl. No. 14/714,174; Non-Final Office Action; dated Aug. 28, 2017; 14 pages.

Trnka et al.; "Topic Modeling in Fringe Word Prediction for AAC"; Int'l Conf. on Intelligent User Interfaces; 2006; p. 276-278

European Patent Application No. 10775846.8; Office Action—94(3); dated Aug. 4, 2017; 6 pages.

"Final Office Action Issued in U.S. Appl. No. 14/452,887", dated Feb. 21, 2018, 60 Pages.

"Non-Final Office Action Issued in U.S. Appl. No. 14/452,887", dated Oct. 5, 2017, 53 Pages.

"Non-Final Office Action issued in U.S. Appl. No. 14/714,174", dated Mar. 7, 2018, 14 Pages.

"First Office Action and Search Report Issued in Chinese Patent Application No. 201610080975.9", dated Dec. 14, 2017, 22 Pages.

\* cited by examiner 23, a 25 which may be located centrally for example and two identical panes, which may be located to the sides, for single/multi character, punctuation or symbol entry 24, 26

27, a 28 and a single pane for single/multi character, punctuation or symbol entry 29. The prediction pane 28 preferably comprises an actual 38, a most button 48 and an button 58

SYSTEM AND METHOD FOR INPUTTING TEXT INTO ELECTRONIC DEVICES

This application is continuation of U.S. patent application Ser. No. 13/262,190, filed Sep. 29, 2011, which is a 371 International Application of PCT/GB2010/000622, filed Mar. 30, 2010, which claims priority to Great Britain Application No. 0905457.8, filed Mar. 30, 2009, the contents of which are incorporated herein by reference in its entirety.

The present invention relates generally to a system and method for inputting text into electronic devices. In particular the invention relates to a system for generating text predictions for display and user selection and a method for doing so.

There currently exists a wide range of text input techniques for use with electronic devices. QWERTY-style keyboards are the de facto standard for text input on desktop and laptop computers. The QWERTY layout was designed for two-handed, multi-digit typing on typewriters in 1878 and has been in wide use ever since. It has proven highly effective given a measure of training and/or experience. Reduced-size QWERTY-style keyboards are also used for text entry on mobile devices, such as PDAs and some mobile phones. These keyboards are generally operated using both thumbs, and their advantage lies in the fact that users are almost always familiar with the QWERTY layout. Devices such as the Blackberry Bold and the Nokia N810 utilise this model.

Text input for mobile phones, however, has focused primarily on methods of entering alphabetic characters using a 9-digit keypad, where each key usually represents either three or four characters. There are various techniques employed to reduce the number of keystrokes required.

Handwriting recognition has been widely used in the PDA market where input is mostly stylus-based. While it has some advantages for users raised on paper-based handwriting, the use of this technology has declined in recent years because it is relatively slow in comparison with most keyboard-based methods. Speech recognition text input systems also exist for both standard and mobile computational devices. These have not been widely adopted due to limitations in accuracy and the adverse effects of noisy environments.

Touch-screen devices offer a highly flexible platform for different styles of text input, and there are many different models currently available. Traditional QWERTY-style 'soft' keyboards are implemented on devices such as the Apple iPhone and many touch-screen PDAs running Windows Mobile. Other devices such as the Blackberry Storm use multi-character soft keyboards with various methods of disambiguation and completion. There are also many third-party systems that offer alternative methods of text entry for touch-screen devices. Examples include ShapeWriter (ShapeWriter Inc.) which is based on recognition of the shapes created by sliding between letters on a QWERTY-style background, and ExIdeas' MessageEase which utilises an optimized keyboard layout for stylus and finger-based entry.

A somewhat different model of text entry is offered by the University of Cambridge's 'Dasher' system, in which text input is driven by natural, continuous pointing gestures rather than keystrokes. It relies heavily on advanced language model-based character prediction, and is aimed primarily at improving accessibility for handicapped users, although it can also be used in mobile and speech recognition-based applications.

Many of the input models discussed above utilise some form of text prediction technology. Known prediction models for enhancing text input have two main functions:

1) Disambiguation of multiple-character keystrokes.
2) Offering potential completions for partially-entered sequences.

Examples of such technologies include Tegic Communications' 'T9', Motorola's ''iTap', Nuance's 'XT9', Blackberry's 'SureType' and Zi Technology's 'eZiTyp'' and ''eZiText'. In each case a dictionary of allowable terms is maintained and, given a particular input sequence, the system chooses a legitimate term (or set of terms) from the dictionary and presents it to the user as a potential completion candidate. T9 requires the user to enter a number of characters equal to the length of the target input sequence, and thus only offers function 1) above, whereas the other systems offer both 1) and 2).

In all of these technologies, the basic dictionary can be augmented with new terms entered by the user. This is limited only by the amount of device memory available. T9 uses a static dictionary, meaning that words sharing the same key sequence are always suggested to the user in the same order. In contrast, Motorola's iTap utilises a dynamic dictionary, meaning that the first word predicted for a given key sequence may not remain the same each time the key sequence is entered. Rather, completions are suggested in order of most recent use. However, this method does not keep track of which completion is the most probable; it merely chooses the one used most recently.

Blackberry's SureType, Nuance's XT9 and Zi Technology's eZiType offer somewhat more sophisticated models, in which candidate completions are ordered on the basis of usage frequency statistics. In addition, Zi Technology's eZiText also has the ability to predict multi-word completion candidates given appropriate input, by scanning a user's previous input to identify high frequency phrases.

The present invention represents a fundamental shift away from predominantly character-based text input to a predominately word- or phrase-based text input. In accordance with the present invention there is provided a system comprising a user interface configured to receive text input by a user, a text prediction engine comprising a plurality of language models and configured to receive the input text from the user interface and to generate concurrently text predictions using the plurality of language models and wherein the text prediction engine is further configured to provide text predictions to the user interface for display and user selection.

Preferably, the text predictions are generated concurrently from the plurality of language models in real time. Preferably, the plurality of language models comprises a model of human language and at least one language model specific to an application. More preferably, the at least one language model specific to an application comprises one or more of an email, SMS text, newswire, academic, blog, or product review specific language model. Alternatively, the at least one language model specific to an application comprises an email and an SMS text specific language model and the text predictions are generated using one or both of the email and SMS text specific language models. The plurality of language models may also include at least one additional language model, which may be a user community specific language model for example.

In an embodiment of the invention, the system includes a mechanism configured to compare a sequence of terms stored in a language model to a sequence of terms stored in one or more other language models and to remove duplicate or multiple entries by retaining only the most probable of the duplicate or multiple entries.

In another embodiment of the invention, the plurality of language models includes a user specific language model based on an n-gram language model that is updated to record the frequency of occurrence of n-gram paths input by a user in an n-gram map. Preferably, the user specific language model is configured, in response to inputted text which is not represented in the user specific language model, to insert new paths into the n-gram map within the language mode.

In a preferred embodiment the text prediction engine comprises a mechanism to combine the predictions generated by each language model. Preferably, the mechanism is configured to insert the predictions into an ordered associative structure or an STL 'multimap' structure and return the p most probable terms as the predictions for provision to the user interface.

Preferably, the plurality of language models utilise a beginning-of-sequence marker to determine word or phrase predictions in the absence of any preceding text input and/or after end-of-sentence punctuation and/or after new line entry.

In an embodiment of the system of the invention, each of the plurality of language models models language using an approximate trie and an n-gram map, wherein the approximate trie is an extension of a standard trie, with a set of values stored at each node for all subsequently allowable character sequences from that node.

In an alternative embodiment of the system of the invention, each of the plurality of language models models language using a probabilistic trie and an n-gram map, wherein the probabilistic trie is an extension of a standard trie, with a set of values stored at each node for all subsequently allowable character sequences from that node.

Preferably, the language model is configured to conduct a search of the n-gram map to determine word or phrase predictions for a next term on the basis of up to n−1 terms of preceding text input. Preferably, the language model is configured to conduct a search of the approximate trie or the probabilistic trie to ascertain word predictions based on at least one inputted character.

Additionally, where the language model comprises an approximate trie, the language model may include a candidate filter to narrow the predictions determined by the approximate trie, wherein the candidate filter is configured to discard all candidate strings for which the current input is not a substring.

The language model may also include a mechanism to compute the intersection of the predictions determined by the approximate trie and optionally the candidate filter, or the probabilistic trie, and the n-gram map, by searching for and retaining only identifiers that are present in both prediction sets In an embodiment, the language model also includes a Bloom filter, comprising an n+1 gram map, which is configured to search the n+1 gram map to return a new prediction set based on a context of 1) the n−1 terms of preceding text input used to search then-gram map, 2) the prediction terms in the determined intersection, and 3) an extra term of context, immediately preceding the n−1 terms used to search the n-gram map.

In an embodiment, the language model further includes a topic filter which is configured to predict topic categories represented in a current input text, predict topic categories for the terms in the prediction set and adjust the probability of the predictions in the prediction set based on the category and topic predictions.

The present invention also provides a touch-screen interface that includes a single or multi-character entry mechanism, a word prediction pane, and a typing pane to display inputted text. Preferably, the interface includes a menu button which toggles the screen between prediction, numbers and punctuation, and further punctuation screens. Preferably, the interface includes a send button to send the inputted text to an email application. Preferably, the user interface is configured for word or phrase input, dependent on which term is chosen for input in a given sequence of words.

Preferably, the word prediction pane includes one or more word keys to present predicted words and wherein, in response to a word key press, the user interface is configured to display the word in the typing pane. Preferably, the interface further comprises a delete button and/or an undo button, wherein in response to a press of the undo button or a left-to-right gesture on the delete button, the interface is configured to undo the previous word selection, by erasing the word from the typing pane and returning to the previous prediction pane.

Preferably, the word prediction pane includes one or more word keys to present predicted words and wherein, in response to a word key press, the user interface is configured to display the word in the typing pane and pass the current input sequence including that word to the text prediction engine as a context input. Preferably, in response to a word key press and hold or left-to-right gesture on the word key, the user interface is configured to display the word in the typing pane, pass the current input sequence excluding that word to the text prediction engine as a context input, and pass the characters of that word to the text prediction engine as a current word input. Preferably, the interface further comprises one or more punctuation keys to present punctuation marks and a return key and wherein, in response to an end-of-sequence punctuation or 'return' key press, the user interface is configured to pass the current sequence to the text prediction engine, wherein the text prediction engine comprises a mechanism configured to tokenise the current sequence and pass the tokenised sequence to the user specific language model, and wherein the user specific language model is configured to assign numerical identifiers to the tokenised sequence and update its n-gram map.

In accordance with the present invention, there is also provided a method for processing user text input and generating text predictions for user selection. The method includes the steps of receiving text input into a user interface, generating concurrently, using a text prediction engine comprising a plurality of language models, text predictions from the multiple language models, and providing text predictions to the user interface for user selection.

In an embodiment, each of the plurality of language models includes an n-gram map and an approximate trie or a probabilistic trie and the method includes the step of conducting a search of the n-gram map to determine word or phrase predictions for a next term on the basis of up to n−1 terms of preceding text input.

In an embodiment, each of the plurality of language models comprises an n-gram map and an approximate trie or a probabilistic trie and the method includes the step of conducting a search of the approximate trie or the probabilistic trie to ascertain word predictions based on at least one inputted character. Preferably, where each of the plurality of language models comprises an approximate trie, the language models also comprising a candidate filter, the method further comprising narrowing the word predictions determined by the approximate trie by discarding all candidate strings for which the current input is not a substring.

Preferably, the language model comprises a mechanism to compute the intersection of the predictions determined by the approximate trie and optionally the candidate filter, or the probabilistic trie, and the n-gram map and the method includes the further step of computing the intersection of the predictions. More preferably, the mechanism searches for and retains only identifiers that are present in both prediction sets.

In an embodiment, the language model comprises a Bloom filter which comprises an n+1 gram map and the method includes the additional step of returning a new prediction set based on a context of 1) the n−1 terms of preceding input text used to search the n-gram map, 2) the prediction terms in the determined intersection, and 3) and extra term of context, immediately preceding the n−1 terms used to search the n-gram map.

In an embodiment, the language model further comprises a topic filter and the method includes the further steps of predicting topic categories represented in a current input text, predicting topic categories for the terms in the prediction set and adjusting the probabilities of the predictions in the prediction set based on the topic category predictions.

In a preferred embodiment, the plurality of language models includes a user specific language model based on an n-gram language model and the method includes the further step of updating the frequency of occurrence of n-gram paths, input by a user, in an n-gram map. Preferably, in response to the input of text which is not represented in the language model, the method includes the step of inserting new paths in the n-gram language model.

Preferably, the text prediction engine comprises a mechanism to combine the predictions generated from each language model and the method includes the further step of combining the predictions, which combination preferably includes inserting the predictions into an ordered associative structure or an STL 'multimap' structure, and returning the p most probable terms for provision to the user interface.

There is also provided, in accordance with the invention a computer program product including a computer readable medium having stored thereon computer program means for causing a processor to carry out the method of the invention.

The predictive text input system and method of the present invention has significant advantages over current technologies. While T9, iTap, SureType etc. are based on term dictionaries, the present system is based on adaptive probabilistic language model technology, which takes into account multiple contextual terms and combines information from multiple language domains in a mathematically well-founded and computationally efficient manner. The present text input system therefore provides a technical improvement that reduces the user labour aspect of text input The present invention will now be described in detail with reference to the accompanying drawings, in which:

FIG. 1 is a schematic of a high level prediction architecture according to the invention;

FIGS. 2a-d are schematics of alternative language models of the prediction architecture according to the invention;

Figure 1:
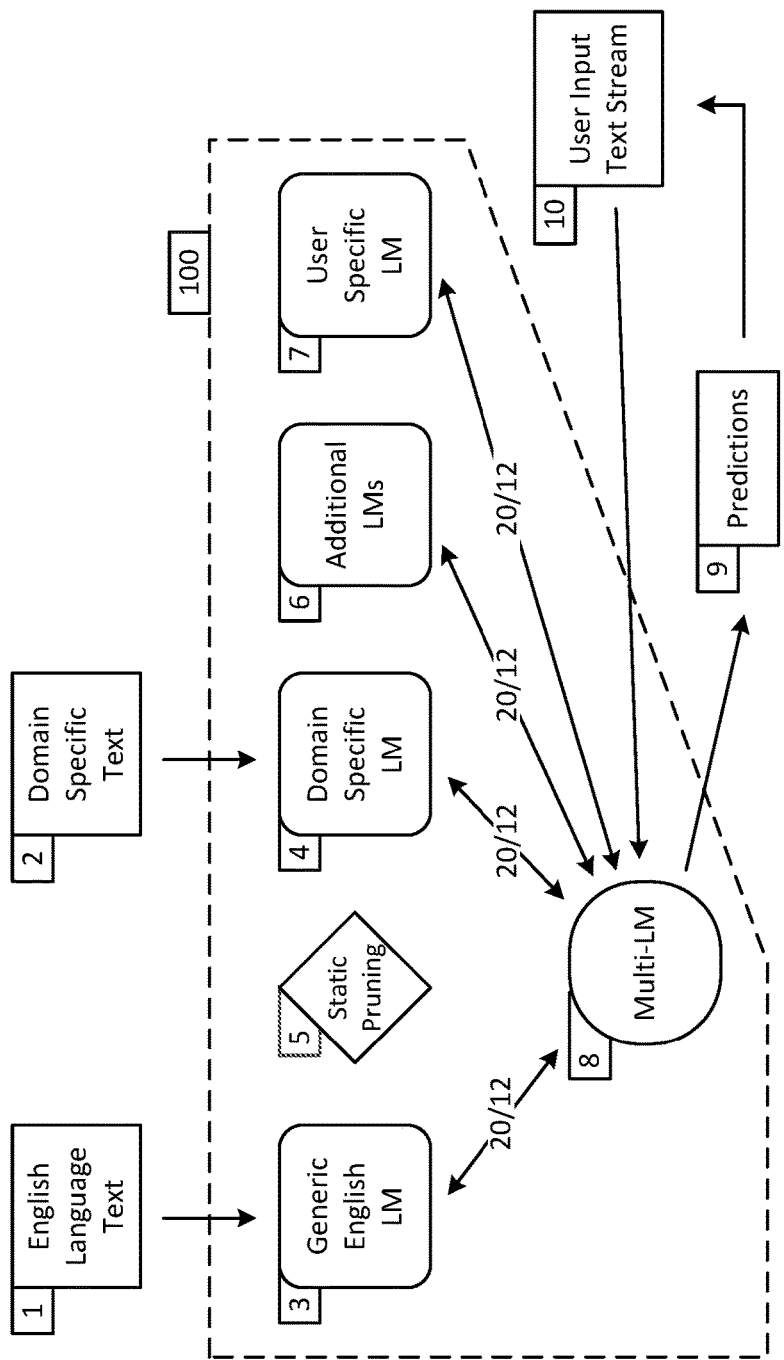

In general, but not exclusive terms, the system of the invention can be implemented as shown in FIG. 1. FIG. 1 is a block diagram of a high level text prediction architecture according to the invention. The system of the present invention comprises a text prediction engine 100 which generates concurrently text predictions 20 from multiple language models. In one embodiment, the system comprises a model 3 of a human language, in this embodiment the English language, and at least one language model 4 specific to an application, although in other embodiments only one of these need be present. In other embodiments, the human language model is of a language other than English. The language models are generated from language texts. Therefore, the model 3 of the English language is generated from English language text 1. The English language text 1 would usually, but need not, constitute a large corpus of English text, sourced from a wide variety of genres and language demographics. Similarly, an application specific language model 4 is generated from text 2 from that specific application.

By way of example only, if the system is a computer or similar device in which the target application is email, then the application specific language model 4 will be a model generated from email language text 2 comprising a large quantity of email messages from a wide variety of authors. Similarly, in the case of a mobile device, the application specific language model 4 will be generated from mobile SMS text language 2. In some embodiments of the system a plurality of application specific language models 4 are required, for example a mobile device can be used for emailing and SMS text messaging, thus requiring an SMS specific language model and an email specific language model. Another example of a system requiring a plurality of application specific language models 4 is that of a computer which can be used for word processing, emailing and sending SMS messages to mobile devices through the internet, thus requiring three application specific language models 4. Other combinations are, of course, possible, and further examples of application specific language models include language models generated from newswires, blogs, academic papers, word processing and patents.

In some embodiments, the system can further comprise additional language models 6. For instance, it might be efficacious to construct a company-specific language model for use within a particular organisation. This may include organisation specific language enabling prediction of preferred or standard wording, for example, during text input. However, it will be appreciated that the additional language models 6 can comprise any 'user community' specific language model. For example the 'user community' specific language model could comprise a local dialect or interest grouping specific language model.

The language models discussed so far are static language models. That is, they are generated from a representative body of text and thereafter are not changed. Of course, new language models can be created and used, but the existing ones in the system of the invention remain unchanged until replaced or removed.

The present system utilises a mechanism 5, static pruning, across all static language models, to reduce the amount of information stored in the system. If duplicate or multiple (in the case of a system comprising three or more language models) entries are detected, the mechanism 5 'prunes' the language models by retaining only the most probable entry. Static pruning is described with reference to a single language model in a later section of the description.

The text prediction engine 100 operates to generate concurrently text predictions 20 from the multiple language models present. It does this by employing a multi-language model 8 (Multi-LM) to combine the predictions 20 sourced from each of the multiple language models to generate final predictions 9 that are provided to a user interface for display and user selection. The final predictions 9 are a set (i.e. a specified number) of the overall most probable predictions. The Multi-LM 8 generates the final predictions 9 by inserting the predictions 20 from each language model into an ordered associative structure which may be an ordered STL 'multimap' structure.

An ordered associative structure is an abstract data type composed of a collection of unique keys and a collection of values, where each key is associated with one value (or set of values). The structure can be used to store a sequence of elements as an ordered tree of nodes, each storing one element. An element consists of a key, for ordering the sequence, and a mapped value. In one ordered associative structure of the present system, a prediction is a string value mapped to a probability value, and the map is ordered on the basis of the probabilities, i.e. the prediction strings are used as keys in the structure and the probability values are used as values in the structure. In the present system, the structure is ordered by the values (rather than by the keys which are the prediction strings). The operation of finding the value associated with a key is called a lookup or indexing.

An STL multimap is a specific type of ordered associative structure in which duplicate keys are allowed. In the STL multimap of the present system, a prediction is a string value mapped to a probability value, and the map is ordered on the basis of the probabilities, i.e. the probability values are used as keys in the multimap and the strings as values. Since, the keys are used to order the structure, the multimap is naturally ordered by the probability values.

By way of example, given the predictions "a"→0.2 and "the"→0.3 from a first language model, and the predictions "an"→0.1 and "these"→0.2 from a second language model, the Multi-LM 8 inserts these predictions into an ordered associative structure or a multimap such that the entries are ordered by their probabilities ((0.1→"an"), (0.2→"a"), (0.2→"these"), (0.3→"the")). This structure/multimap can subsequently be read from the upper value end to obtain a set of final 'most probable' predictions 9.

In the preferred embodiment, the system further comprises a user specific language model 7, which comprises a dynamic language model trained progressively on user input. The user input text stream 10 refers to the evolving text data generated by the user which is then fed back into the dynamic user specific language model as progressive training data. In response to the input of end-of-sentence punctuation or a 'return' character, or at an otherwise predetermined time, the user inputted text sequence is passed to the Multi-LM 8 which splits the text sequence into 'tokens' as described later. The tokenised sequence data 12 is then passed to the user specific language model 7. The updating of a dynamic language model is described in a later section of the description, with reference to the structure of a single language model.

By updating the user specific language model 7, the language model evolves with user input 10, thereby providing a feedback loop in which predictions generated by the user specific language model 7 depend on the selection by the user of previous predictions 9 generated by the text prediction engine or the addition of words initially absent from the system (which are input by character entry).

Thus the present system utilises two types of language models, static and dynamic. The user specific language model 7 is an example of a dynamic language model.

The system of the present invention is built around the principle of predictive language model inference, in which the probability of a particular term is estimated given a particular context, P(term|context), for all terms in the language. The probabilities are estimated from data observed in training and through dynamic usage of the system. Here, "context" denotes both the terms that have occurred previously in the sequence, as well as any knowledge the system has about the current term (e.g. it starts with a specific character or characters, or it is indicative of a certain topic). Given a particular context, the system predicts the words that are most likely to follow by using estimates of probabilities, P(term|context).

The text prediction engine has the capability of performing phrase-level prediction. For instance, if it is to predict the next two terms, it requires an estimate for P(term1, term2|context) which can be rearranged as P(term1|term2, context)*P(term2|context). P(term1|term2, context) is just P(term1|context2), which is a probability in the format P(term|context), for which it has estimates. P(term2|context) is also in the format P(term|context), for which it has estimates. Therefore, the text prediction engine has the necessary information to perform phrase-level prediction.

Phrase-level prediction significantly increases the upper-bound computational cost, as the predictive text engine must now search in the space of combinations of terms ($O(n^m)$ where m is the length of the phrase), but the present system utilises effective methods of rendering the computational cost manageable.

The system limits the space of combinations of terms (i.e. the space of potential phrase predictions) to a tiny fraction of the full $n^m$, thus reducing the computational costs. To do this, given a predicted term $t_i$, the ith term in a predicted phrase, a following term $t_i+_1$ is only predicted if the joint probability $P(t_0, t_1 \ldots, t_i)$ exceeds the value of the lowest probability in the current prediction set. The joint probability estimate is obtained by multiplying together each of the individual component probabilities, thereby requiring that a high degree of certainty be attained before a phrase prediction is made. Further phrase-level predictions will not be made if the joint probability falls below a threshold value.

The generation of predictions from an individual language model is now described with reference to FIGS. 2*a-d,* which are block diagrams of alternative language models of the prediction architecture according to the invention.

There are two inputs into a given language model, a current term input 11 and a context input 12. The current term input 11 comprises information the system has about the term the system is trying to predict, i.e. the term the user is attempting to enter. This could be a sequence of multi-character keystrokes, individual character keystrokes or a mixture of both. For example, if the user was attempting to enter the term "overt", and had input two keystrokes on a multi-character keyboard, the current term input 11 might be the set {o/p, v/x/z}, indicating that the 2-character-key o/p and the 3-character-key v/x/z had been used.

Figure 2A:
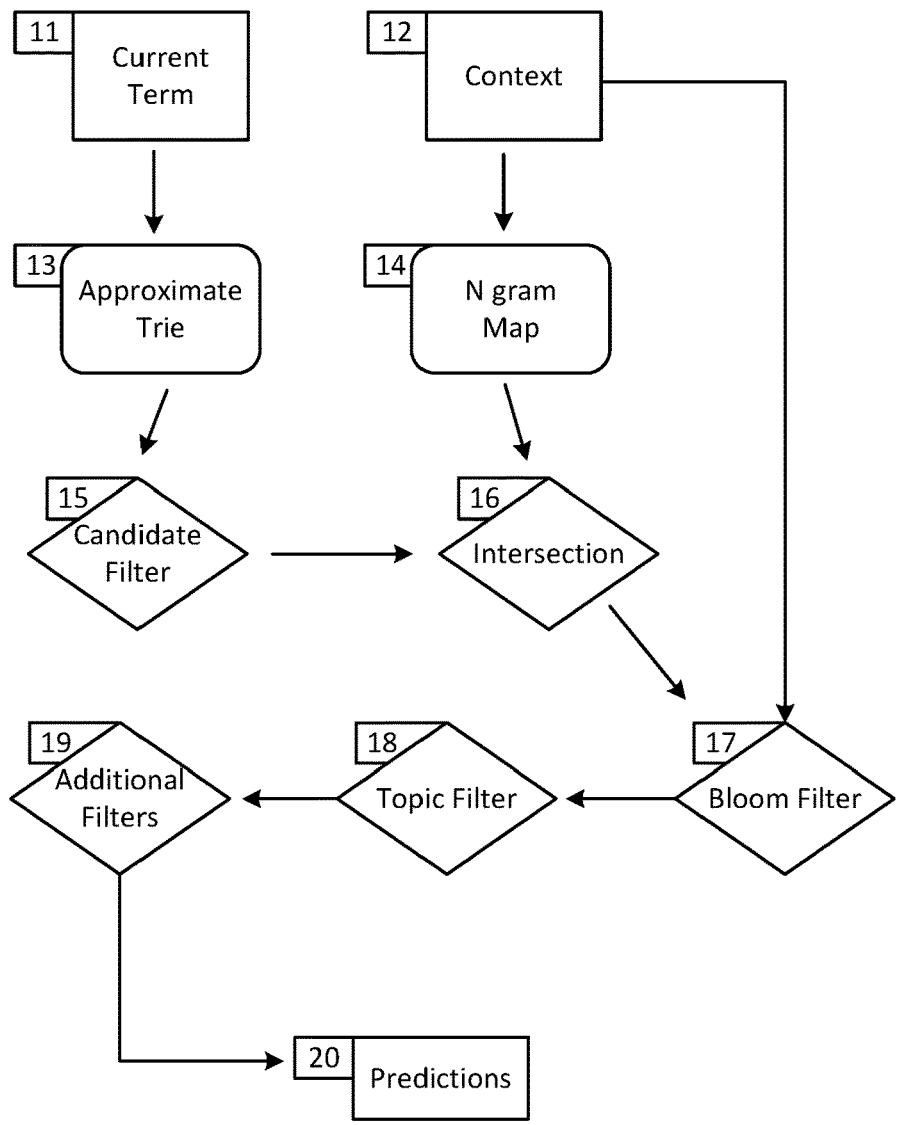
Figure 2B:
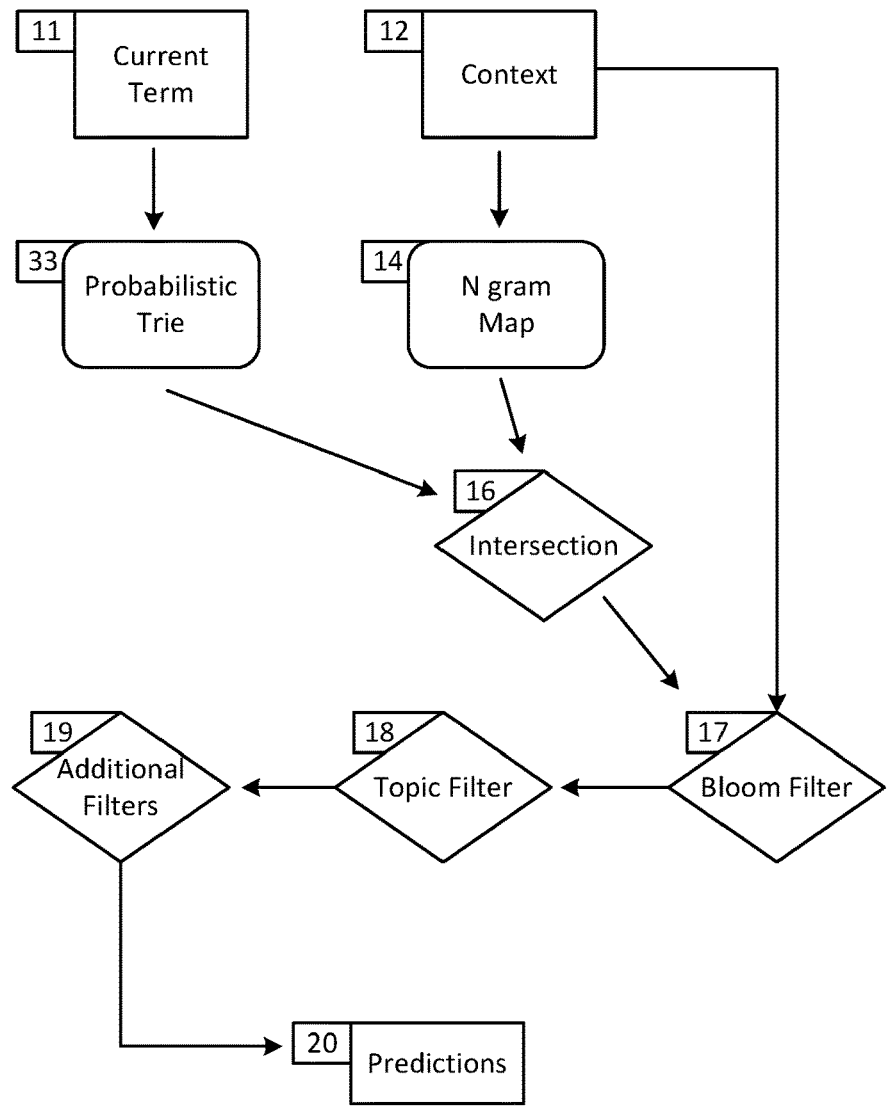
Figure 2C:
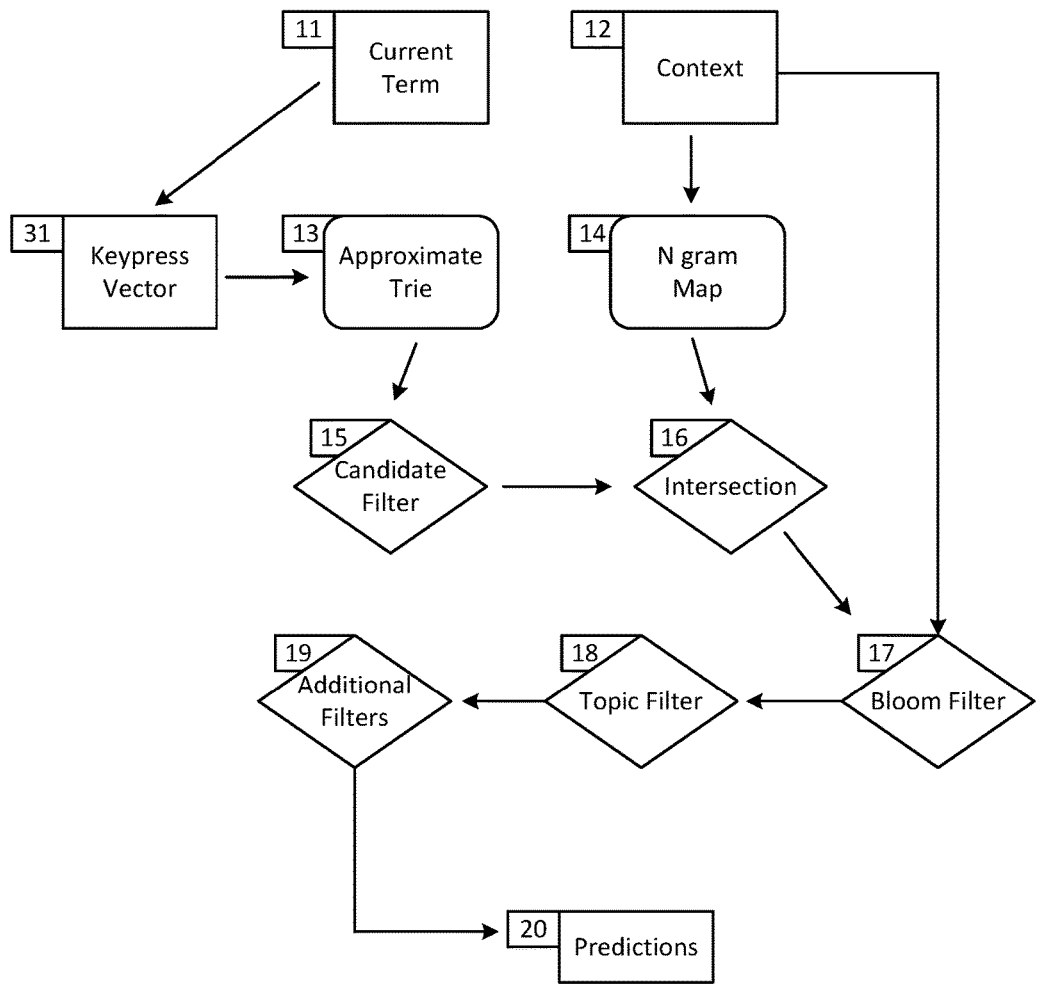
Figure 2D:
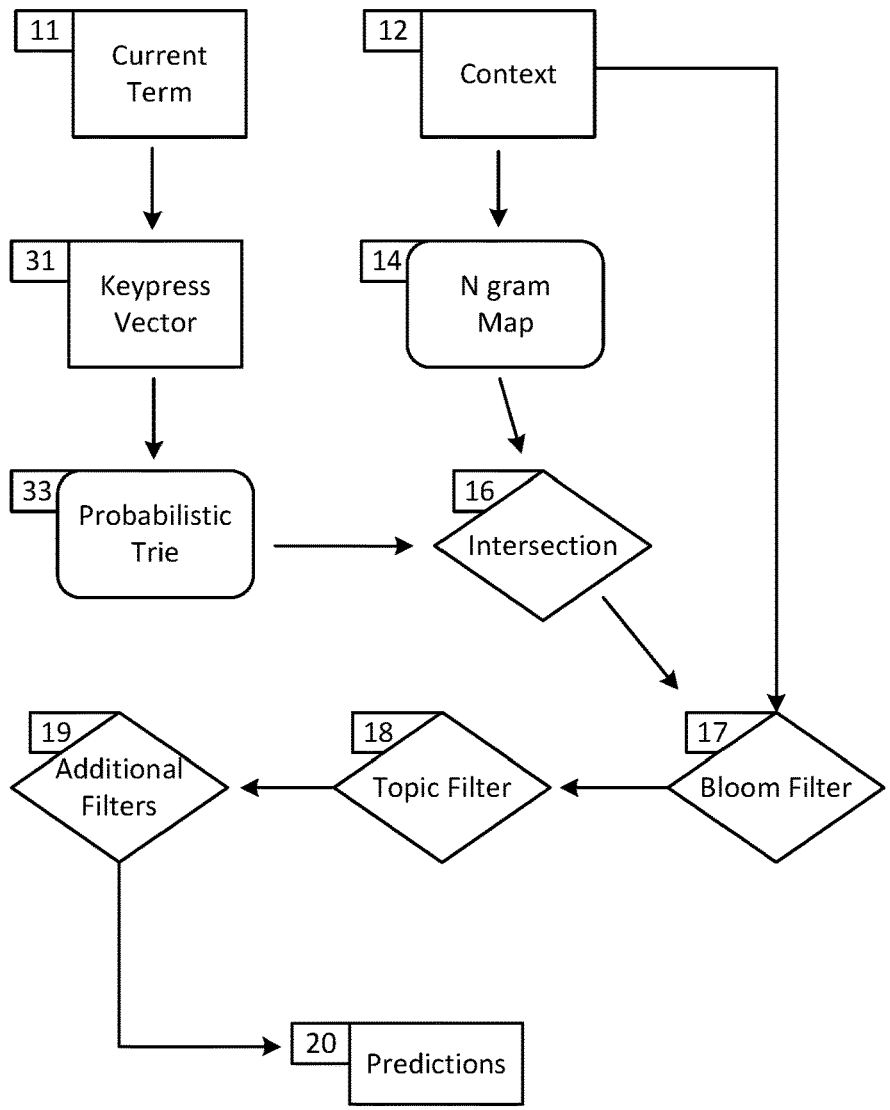

As shown in FIGS. 2c and 2d, the system can be configured to generate a KeyPress Vector 31 from the current term input 11. The KeyPress Vector takes the form of an indexed series of probability distributions over character sequences. For example, if the user has entered the characters 'i' and 'm', using individual character keystrokes, the KeyPress-Vector can codify possible alternatives the user might have been intending, e.g.: im, Im or I'm.

The KeyPressVector 31 contains a number of elements equal to the number of keystrokes made by the user, in this example two. An example of a KeyPressVector generated to allow the alternatives shown above might be {[(i–>0.7), (I–>0.3)], [(m–>0.7), ('m–>0.3)]}. There are two elements to the KeyPressVector, [(i–>0.7), (I–>15 0.3)] and [(m–>0.7), ('m–>0.3)].

The first element states that the user intended to enter the character 'i' with 0.7 probability, and the character 'I' with 0.3 probability. The second element states that the user intended to enter the character 'm' with 0.7 probability and the character sequence ''m' with 0.3 probability.

As the skilled reader will be aware, the KeyPress Vector embodiment is not restricted to individual character keystrokes, and could be used for multi-character keystrokes as well. In the case of multi-character keystrokes, the first element of the KeyPressVector 31 will comprise probability values relating to the multiple characters associated with that keystroke. If the user were to press a key representing the characters g, h and i, the first element of the KeyPressVector will comprise probabilities values associated with g, h and i, and the first element of the KeyPress Vector will be [(g–>0.33))], [(h–>0.33)], [(i–>0.33)], as each of the characters sharing the keystroke will have an equal probability.

The probability distributions associated with each keystroke can be generated in a multiplicity of ways. As a non-limiting example, given a standard QWERTY keyboard layout, it can be assumed that if the user enters a particular character, there is some probability that he/she actually meant to press the characters immediately adjacent. By way of a non-limiting example, if the user enters the character 'k', the KeyPressVector might assign a small probability to the characters , 'j', 'i', 'l' and 'rn' as they are immediately adjacent to 'k' on the QWERTY keyboard.

Alternatively, probability values might be assigned to characters on the basis of their distance from the point of contact on a touchscreen device. For instance, let's assume that the user touched on the 'h' character key, with the following distances from surrounding key centroids:

1) h: 0.05
2) j: 0.3
3) g: 0.25
4) y: 0.5
5) n: 0.45
6) b: 0.7
7) u: 0.7

The normalised inverse of these distances (i.e. p=(1/d) I D, where p is the resultant probability, d is the distance for a particular character, and D=L 1/d, the sum over all inverse distance values) can be used to generate probabilities for the KeyPressVector, e.g.

1) h=20/34.41=0.58
2) j=3.33/34.41=0.1
3) g=4/34.41=0.12
4) y=2/34.41=0.06
5) n=2.22/34.41=0.65
6) b=1.43/34.41=0.04
7) u=1.43/34.41=0.04

More intricate and accurate methods of generating probabilities in the KeyPressVector have the advantage of improving the accuracy of the predictions, but disadvantageously they are usually more costly to compute. Probabilities for character sequences such as 't (which can be used to automatically add an apostrophe before the character 't') must be established a-priori.

Figure 3:
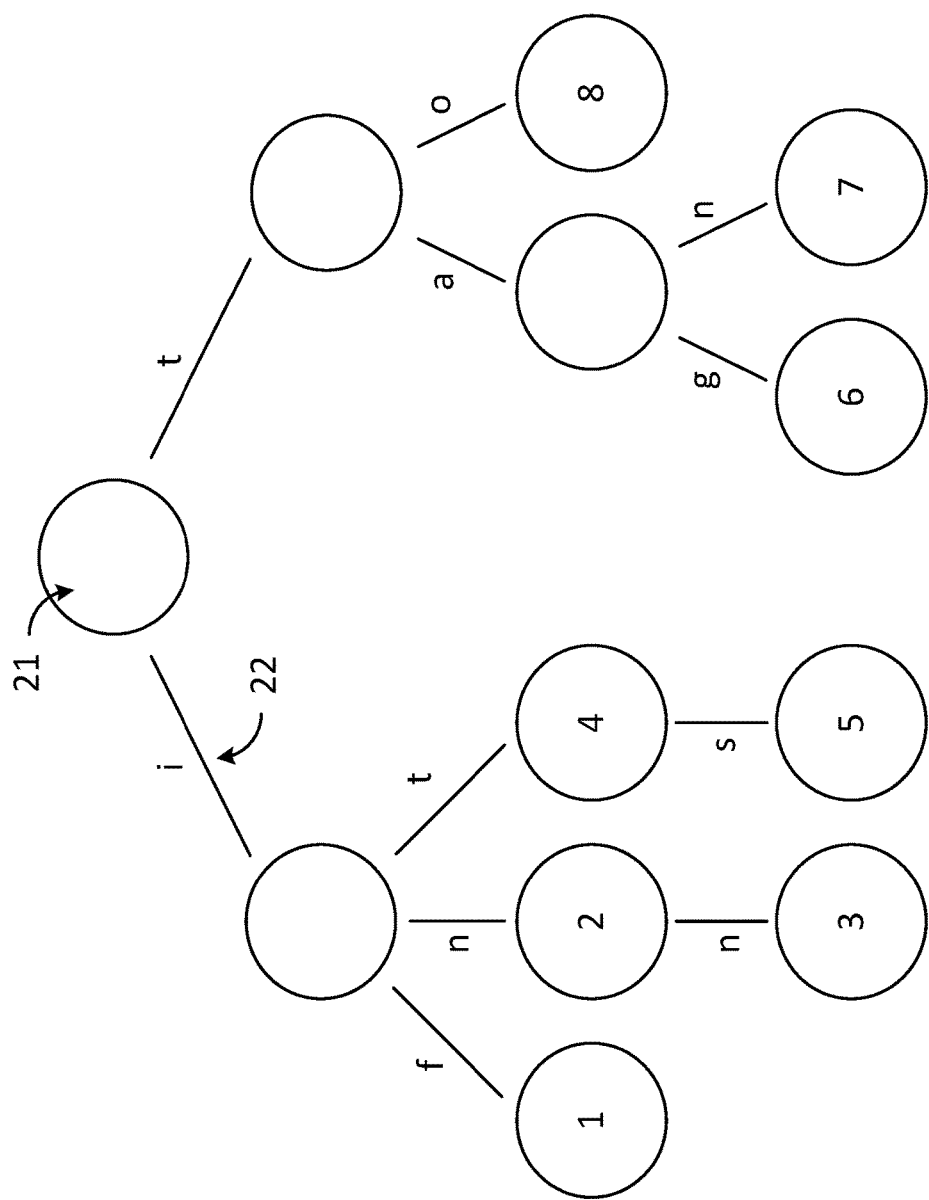
FIG. 3 is a schematic of a standard trie.

Each language model utilises an approximate trie 13 (see FIGS. 2a and 2c) or a probabilistic trie 33 (see FIGS. 2b and 2d) to generate word predictions based on the current term input 11 or the KeyPress Vector 31. An approximate trie 13 or a probabilistic trie 33 is an extended version of a standard trie. A standard trie, or prefix tree, as is known in the art, is an ordered tree-like data structure used to store an associative array of character sequences. An example of a standard trie, used to store a small set of text strings, is illustrated in FIG. 3. Each node 21 contains a pointer 22 to subsequent nodes. Terminal nodes (i.e. nodes which end a word) also contain a value associated with the current path. In a trie, as depicted, characters associated with a given node are ordered alphabetically and the nodes are assigned values according to the alphabetical ordering of the paths. The number of paths from each node is upper bounded by the number of characters in the alphabet. Standard tries facilitate rapid retrieval with efficient storage overheads.

Figure 4A:
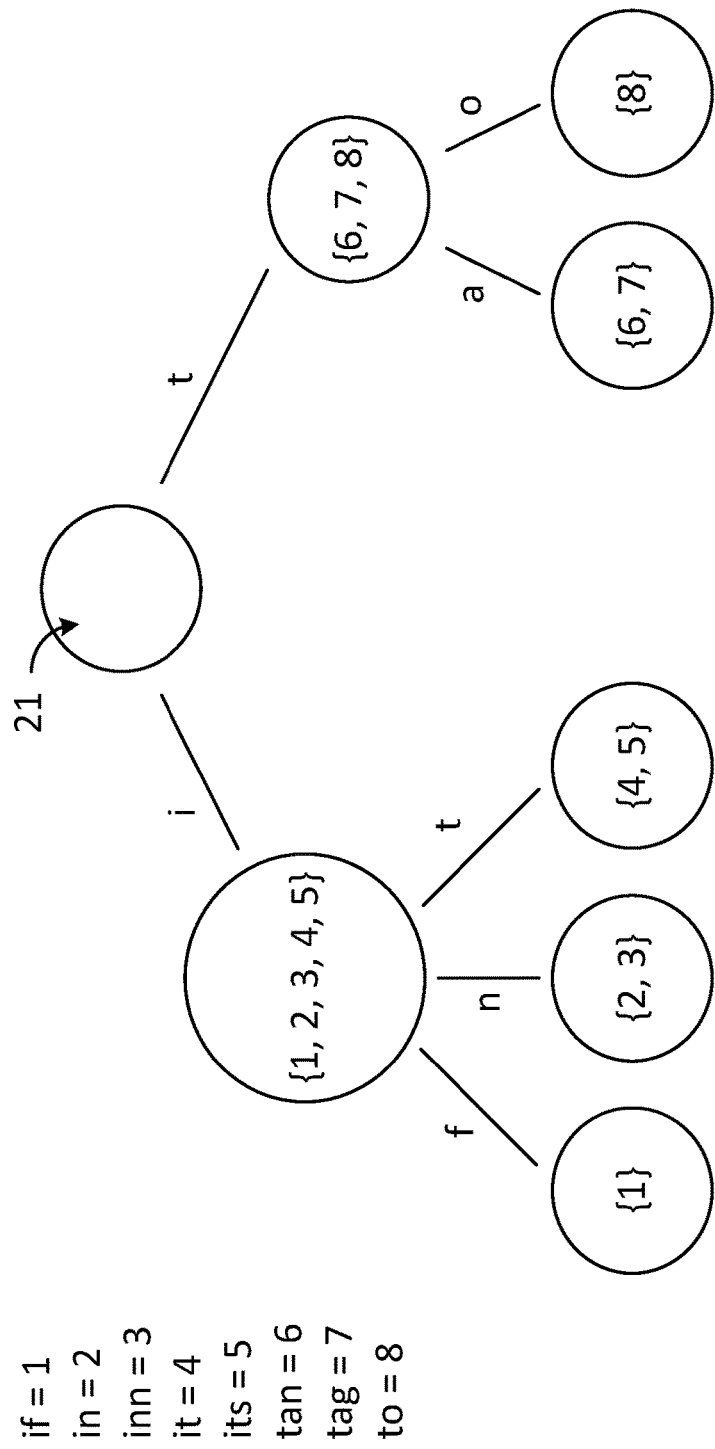
FIG. 4a is a schematic of a compressed approximate trie.

FIG. 4a illustrates an approximate trie 13 according to the invention and used to store the same set of text strings as the standard trie of FIG. 3. Instead of storing a single value at each node 21 associated with a path, an approximate trie 13 stores a set of values for all subsequently-allowable sequences. This extension from a standard trie optimises computational efficiency and memory overheads. It enables the text prediction engine to rapidly identify all sequences that could follow from a given prefix. It also allows the text prediction engine to specify a maximum depth for the internal tree and still guarantee that for any given sequence, if a specified character sequence and associated value was added to the trie then the set of returned values when searching for the given sequence will necessarily contain the respective value.

By way of example, the term "investigate", mapped to numerical identifier '9', can be added to an approximate trie of depth 4 in a language model. The language model will initially follow, in the approximate trie, the path to the node represented by the character 'i' and add the identifier '9' to the set of values at that node (because each node stores a set of values for all subsequently-allowable sequences). It will then follow the path to the node represented by 'n' and add '9' to its values, and the same for 'v', and 'e', at which point the maximum depth has been attained and so the procedure terminates. Subsequently, if "investigate" is being searched for by a language model, the language model will conduct a binary search of the approximate trie to follow the path 'i'→'n'→'v'→'e' and then return the set of values at the node representing 'e', which will necessarily contain the value '9'. However, the set of values at the node representing 'e' will also contain values for any other strings that have also been inserted and begin with "inve".

Hence, the language model cannot guarantee that additional sequence values that are not compatible with a specified search sequence will not be returned, when the current term input exceeds the maximum depth of the approximate trie. Hence, the extension from a standard trie is named as an 'approximate trie', because interrogation returns an approximation to the true set of associated values.

Figure 4B:
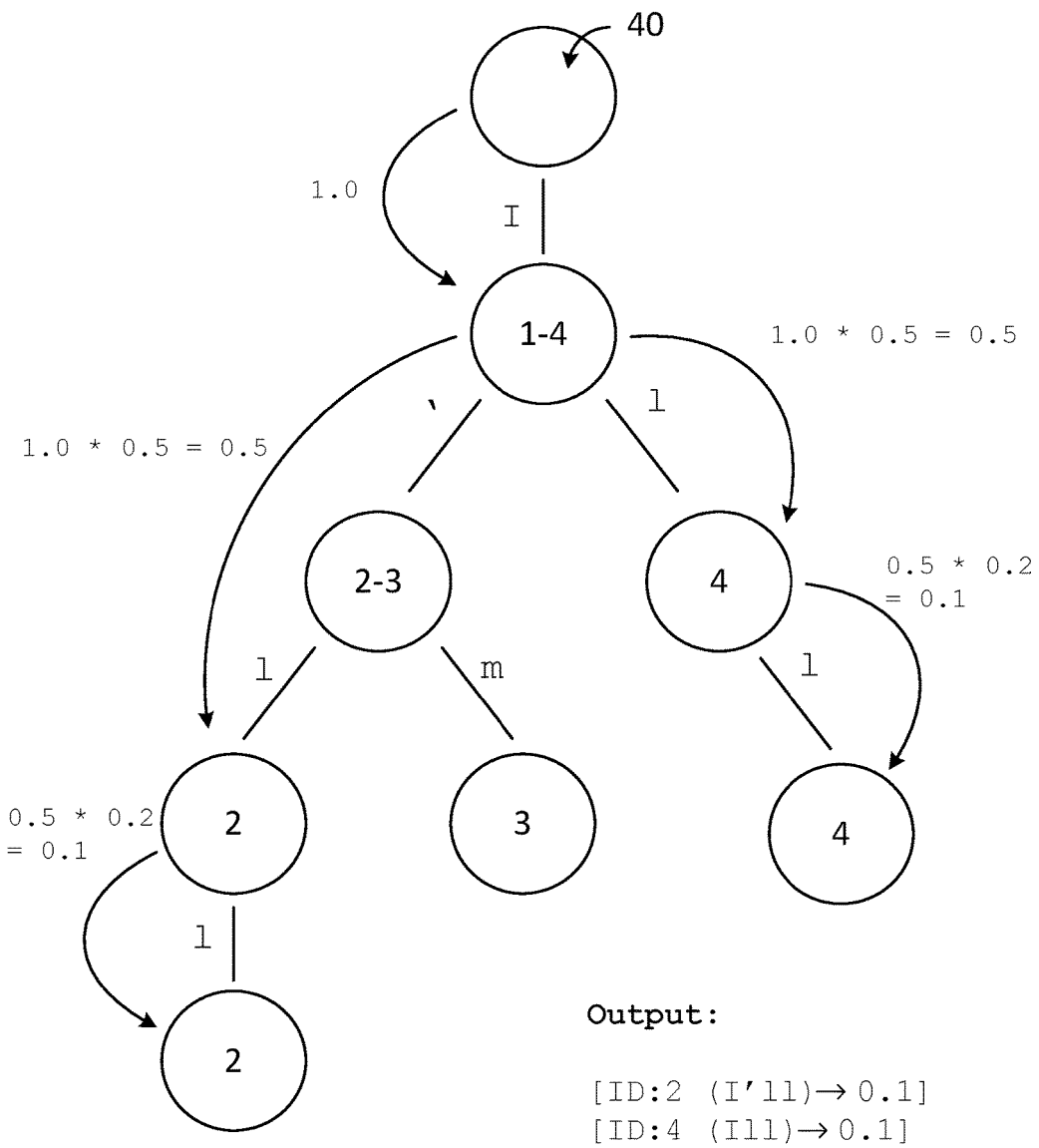
FIG. 4b is a schematic of a probabilistic trie.

An alternative to the approximate trie is shown in FIG. 4b which schematically shows a probabilistic trie 33. In the illustrated example, the probabilistic trie 33 is used to store the following complete term sequences: "I", "Ill", "I'll", "I'm", as well as substrings such as "ll", "I'l" etc. The arrows illustrate how the probabilistic trie is interrogated, given a particular KeyPress Vector 31. In FIG. 4a, the KeyPress Vector has three elements, corresponding to three keystrokes:

1) [(I–>1.0)]
2) [(l–>0.5), 'l–>0.5)]
3) [(l–>0.2)]

Note that for simplicity in this example, the third element of the KeyPressVector consists of a single element with probability 0.2. In practice, each element would consist of a true probability distribution, i.e. summing to 1. Furthermore, for simplicity, this example describes an individual character entry keystoke.

Each arrow in FIG. 4b represents recognition of a sequence within the KeyPressVector (which relates to a character that has been entered by a keystroke), and the interrogation procedure attempts to follow every possible path through the KeyPress Vector as it descends through the probabilistic trie. If a match is found, the associated probability value for the sequence is multiplied with the current cumulative probability state, and the process continues. The output from interrogation of the probabilistic trie is a sequence of term identifiers mapped to probability values, each term identifier representing a term for which a single path through the KeyPress Vector is a (potentially improper) substring.

In this example, if the probabilistic trie is being interrogated with the KeyPress Vector, the system would begin at the root node 40, and attempt to follow the sequence contained in the first item in the first element of the KeyPressVector, which in this case is the character "I". The only path leaving the root node contains the character "I" so the system follows it and updates the probability state to 1.0. Since there are no further items in the first element of the KeyPress Vector the system moves to the next element, first attempting to follow the character 'l' and then the sequence "'l". Both options match the structure of the trie, so both paths are followed and the probability state splits into two, with the relevant multiplication performed in each. In both cases the current state is multiplied by 0.5 to yield 0.5. Note that the system has traversed two states within the trie to follow the "'l" path, but this is considered a single probabilistic transaction, as specified by the KeyPressVector because the user did not enter the apostrophe. The system then moves onto the final element in the KeyPress Vector and attempts to match the character 'l' from both current states. This is a success, and the relevant probabilistic multiplications are made in both cases, yielding current states of 0.1. As there are no further elements in the KeyPressVector, the system returns the values in the nodes at each end point, along with their respective probability state values, in this case the indentifiers 2 and 4, both mapped to the probability value 0.1.

Figure 4C:
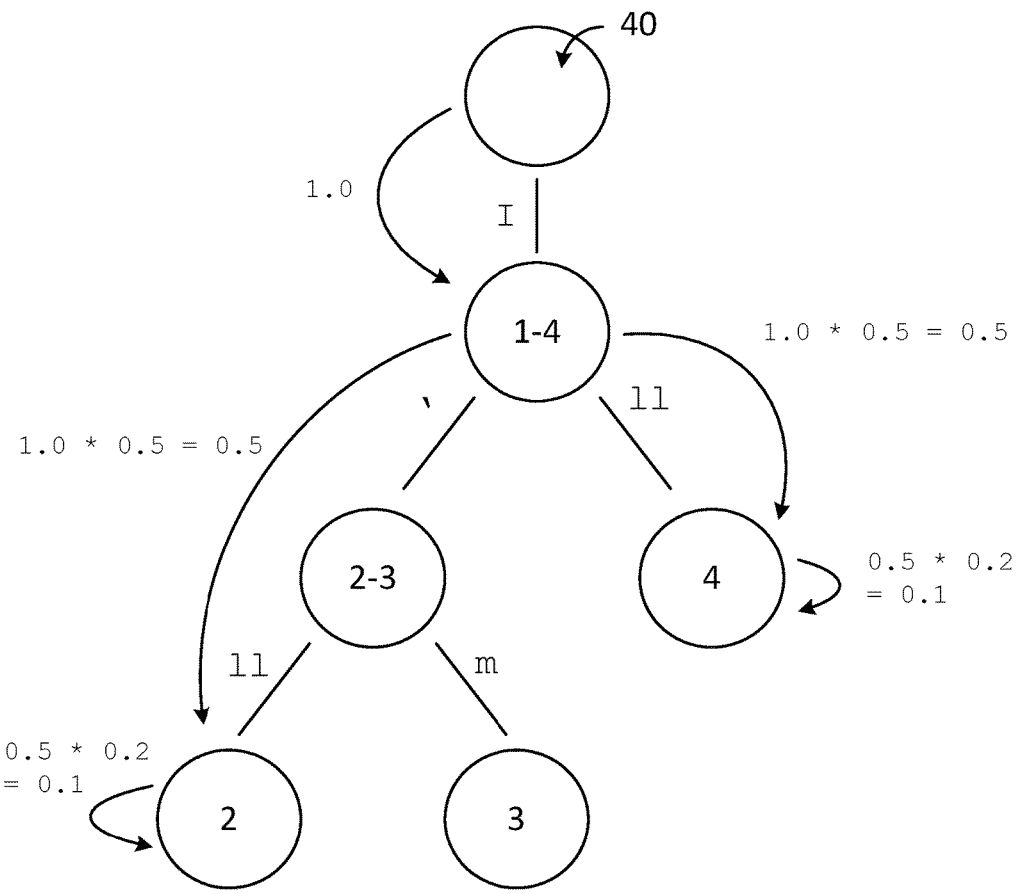
FIG. 4c is a schematic of a compressed probabilistic trie.

To increase memory efficiency the system compresses the full probabilistic trie in a manner known in the art, in a similar way to the compressed approximate trie of FIG. 4a. The probabilistic trie 33 is compressed by concatenating adjacent nonbranching nodes. FIG. 4c shows the result of the compression process on the probabilistic trie of FIG. 4b. Paths within the probabilistic trie may now contain multiple characters and some of the arrows begin and end at the same node.

Preferably the system of the present invention uses a probabilistic trie 33 rather than an approximate trie 13. The probabilistic trie has the advantage of mapping probability values to character strings. Furthermore, the probabilistic trie 33 is not restricted to a specified maximum depth. However, the choice of trie will be dependent on such factors as the available memory.

As the skilled reader will be aware, the KeyPress Vector 31 and probabilistic trie 33 of the present invention can be used to correct for mistakes in the character entry of a word, in addition to the omission of punctuation marks. Analogous to the example of the insertion of an apostrophe which was omitted by the user, the present system can be configured to insert a repeated character which was omitted by the user. For example, if the user were trying to type 'accommodation', but typed the characters 'a-c-o', the system can account for the missing 'c' by inserting a 'c'. For this example, the KeyPressVector 31 for the character sequence could be [("a"–>1), ("c"–>0.9, "cc"–>0.1), {"o"–>1)]. This KeyPress Vector 31 encodes the specific case where a single consonant input is associated with its double counterpart, e.g. c–>cc, d–>dd, m–>mm, etc.

The KeyPress Vector 31 can be generalised to account for a missing character entry after each and every character inputted into a system. For example, the KeyPressVector could be generalised to be [("a"–>0.9, "a*"–>0.1), ("c"–>0.9, "c*"–>0.1), ("o"–>0.9, "o*"–>0.1)]. In this example of a KeyPressVector 31, every single character input is associated with a potential double character input, but the identity of the second character is left unspecified. The omitted character symbol "*" is implemented in the probabilistic trie by following all possible paths from the current node, with the specified probability. So, in the example above, given the first element: ("a"–>0.9, "a*"–>0.1) the path corresponding to the character "a" will be followed with probability 0.9. and all existing paths corresponding to "a" followed by another character will also be followed, but with probability 0.1. Examples of such paths could include "ab", "ac", "ad", "a–" etc.

A similar concept can be implemented to insert a null character, i.e. to ignore a character entered by a user. For example if the user inserted the characters 'n-e-c-c' when trying to type 'necessary', the system can be configured to ignore a repeated consonant, i.e. to search for the sequence 'n-e-e' only. An example KeyPressVector 31 for the character entry 'n-e-c-c' could therefore be [("n"–>1), ("e"–>1), ("c"–>1), ("c"–>0.9, " "–>0.1)], where " "–>0.1 corresponds to matching an "empty" string with an (example) probability of 0.1. The KeyPressVector can be generalised to 'ignore' each character entered by the user, by inserting a null character with a certain probability after each character entered. Such a generalised KeyPressVector 31 may be [("n"–>0.9, " ">0.1), ("e"–>0.9, " "–>0.1), ("c"–> 0.9, " "–>0.1), ("c"–>0.9, " "–>0.1)]. The null character, " ", is implemented in the probabilistic trie by the KeyPress Vector remaining at the current node. These concepts can be extended to associate a small probability that the user has omitted a character or inserted the wrong character after the entry of each and every character in a sequence entered by a user.

Obviously, such an implementation will increase the computational costs associated with the system (the "*" operator has a dramatic effect on the number of paths followed), however, it will allow the system to be more tolerant to the incorrect spelling or typing of a user.

Reverting to FIG. 2a or 2c, a candidate filter 15 can be applied by the language model to narrow the set of predictions returned from the approximate trie 13 so that it contains only identifiers for candidates that are truly allowed by the current word input. Candidate filtering is only necessary when the length of the current input exceeds the maximum depth of the approximate trie, which, to be of any use, must be at least 1, and values of around 3-5 are usually appropriate. Even then, however, it need not be used. The depth of the approximate trie is specified a-priori for each language model. The candidate filter looks up the actual candidate term string values represented by the numerical identifiers in the set of numerical identifiers returned by the approximate trie and processes them one-by-one, comparing each with the current input. For a given candidate string s, if the current input is not a substring of s then it is discarded as not a true candidate.

As the reader will understand, a candidate filter is not required to narrow the predictions returned by a probabilistic trie 33 (see FIGS. 2b and 2d), because a probabilistic trie 33 is not restricted to a specified maximum depth.

The context input 12 comprises the sequence entered so far by the user, directly preceding the current word. This sequence is split into 'tokens' by the Multi-LM 8, where a token is an individual term, punctuation entity, number etc. The Multi-LM 8 feeds the tokenised sequence data 12 into each language model as a context input. If the system is generating a prediction for the nth term, the context input 12 will contain the preceding n−1 terms that have been selected and input into the system by the user.

Figure 5:
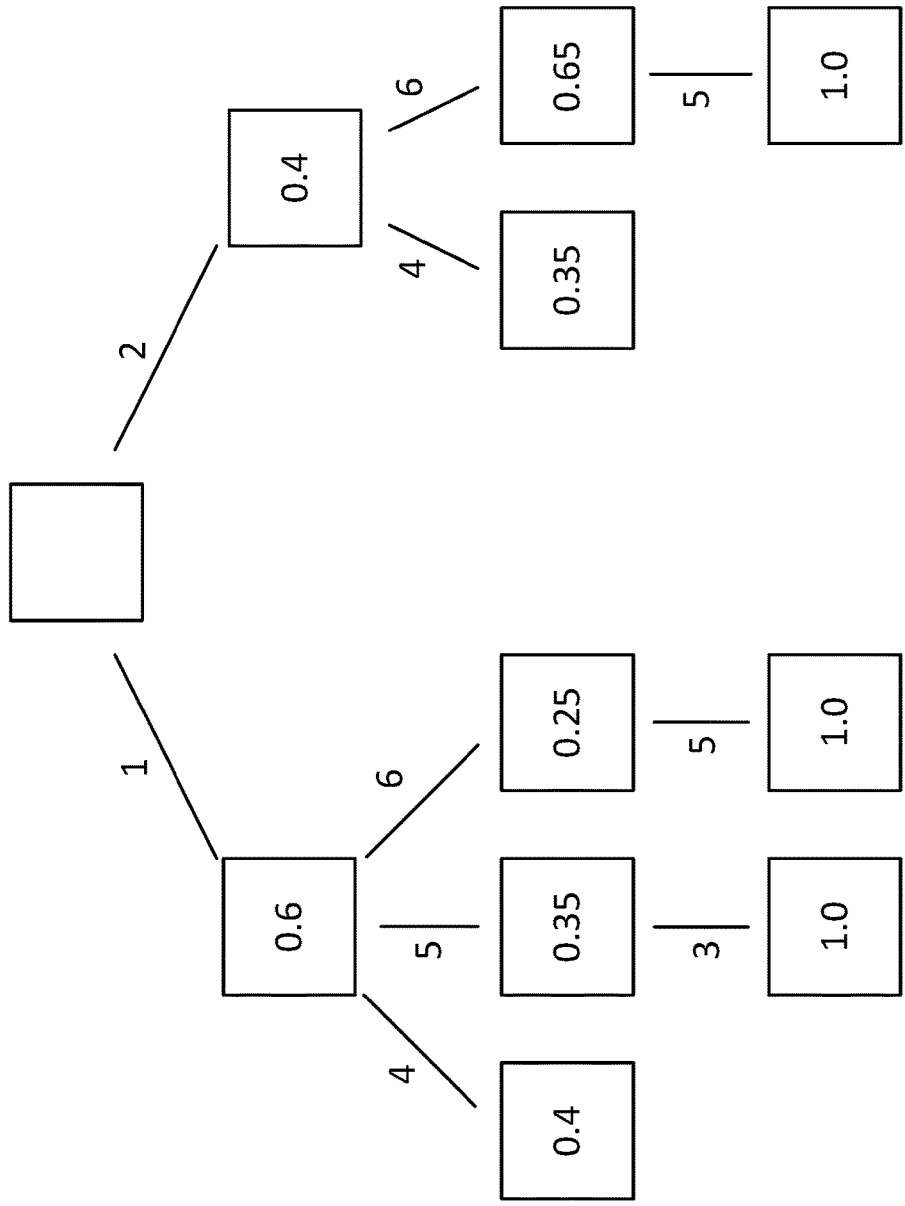
FIG. 5 is a schematic of an n-gram map.

The language model utilises an n-gram map 14 to generate word and/or phrase predictions based on the context input 12. An n-gram map is an associative map structure, as schematically shown in FIG. 5. In the n-gram map 14, terms in the vocabulary are associated with numerical identifiers (short integers) which are stored in the map and associated with probability values. The combined probabilities of child nodes for a single parent always sum to 1. Identifiers are assigned to terms such that the resulting ordering is from most-to-least frequent, as estimated from the training data used to train each language model. Therefore, the identifiers define an ordering by P(term), which is the unigram probability of terms in the language. This is important because it optimises the efficiency at which the text prediction engine can conduct n-gram retrieval, by making the approximation P(term|context)~P(term). This approximation is made by ordering the terms at a given n-gram map level by P(term) rather than their true probabilistic ordering which would be P(term|context).

In the present system, n-gram probabilities are stored in a compressed manner to facilitate wide coverage and rapid access on memory-limited devices. The probability values are compressed, preferably, according to the (lossy) discretization procedure, in which the values are discretized and spread over the range of values available in a single byte of memory. Given a true probability value p, the following formula is used to map it into a single byte of memory: b=int(abs(log(p))*10), where int(x) yields the rounded integer part of real-valued x, and abs(x) yields the absolute value of x.

The n-gram maps can be further compressed by representing string values as short-integer-valued numerical identifiers and by storing higher-order entries "on top of" lower-order entries. So, for example the trigram "in the morning" is stored in the same location as the bigram "in the", but with a link to the additional n-gram head term "morning", i.e. by storing a set of numerical values (identifiers) for all subsequently-allowable sequences at each node in the n-gram map.

To generate predictions from an n-gram map 14, at each map node 21 the language model conducts a binary search to locate specified subsequent child nodes. For example, if the context comprises term1 and term2, the language model will first locate the node for term1. Term2 is then the specified child node that will be searched for. To facilitate this search, child nodes are ordered numerically by their identifiers at each parent node. The node that is being searched for may contain a large number of children, but it is only the high probability candidates that are of interest. Because the nodes are automatically ordered by P(term), the language model can be configured to return only the first k children, where k is a preset value. This method assumes that the highest probability candidates under P(term|context) will reside in the set of the k highest probability candidates under P(term), as long as k is large enough. It is not feasible to order child nodes by P(term|context) as this would require a different map ordering for every node and vastly increase memory overheads.

The generation of predictions from an n-gram map 14 is described further in the following illustrative example. If the language model is searching for the highest probability term candidates, given the two context terms "in" and "the", the language model will search for the terms t that maximise the trigram (3-gram) probability P(t|in the). The language model first looks up the identifier for "in" and then conducts a binary search in the first level of the map to locate the identifier (if it exists). Following from the "in" node, the language model looks up the identifier for "the" and conducts a search to locate it in the next map level. It is likely that this node has many children because "in the" is a common prefix, so the language model is configured to return the identifiers for the first k children (inversely ordered by P(term)), which might correspond to terms such as "morning", "first", "future", "next", "same"' etc.

The n-gram map structure described thus far is used in static language models. Static language models are immutable once they have been constructed and directly store compressed n-gram probabilities; they are generated from pre-existing data and are then compiled into binary format files which can be read at run-time.

Conversely, dynamic language models, such as the user specific language model 7, can be updated at any point, and predictions from this type of model are constantly changing as new data is processed.

A dynamic language model is updated in one of two ways: to include a term which is not previously present in a dynamic language model vocabulary; and to update the frequency of an existing term in a particular n-gram context. The dynamic n-gram map stores the frequency at which n-gram paths are input by a user, wherein an 'n-gram path' refers to a particular term and up to n−1 terms of preceding context.

For a current term t, current context c, and dynamic language model D, if t does not exist in the vocabulary of D, then the dynamic language model D maps the term t to a new identifier and inserts it into the approximate trie or the probablilistic trie. To enter a term which does not exist in the vocabulary of the language model D, a user can insert the term by inputting it character-by-character into the user interface of the system. The dynamic language model D then follows the path represented by term t and its context c in the n-gram map and new nodes are created if they do not already exist, thereby creating new n-gram paths in the language model dependent on the preceding context c of the current term t. Paths are added to the dynamic n-gram map for varying context lengths, from no context to n−1 terms of context, where n is the maximum n-gram order for the language model. When a user enters the term t at a later time, the language model D increments a count value stored at the node, of the n-gram map, representing the term t by one, and increments the total value of its parent node by one also. In this way, the frequency of input of the n-gram paths comprising a term t and its varying context, from no context to n−1 terms of context, are updated in the n-gram map.

Figure 6:
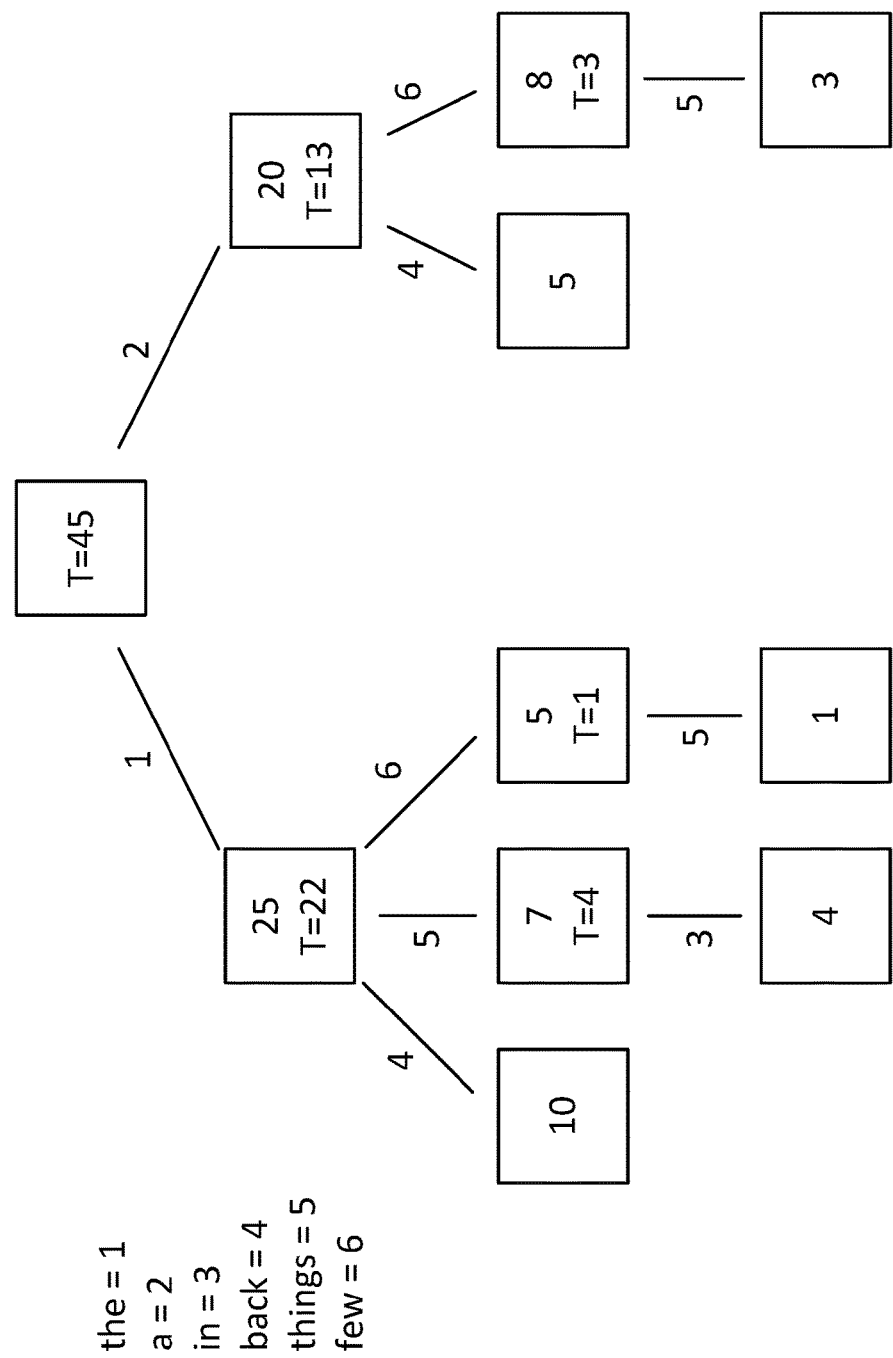
FIG. 6 is a schematic of a dynamic n-gram map.

The n-gram probabilities of a dynamic language model are not stored directly, rather frequency statistics are stored. An example of a dynamic n-gram map is shown in FIG. 6. Each node stores a frequency value, rather than a probability, along with a combined frequency for its children (denoted by "T="). Probabilities are computed on-the-fly from these frequency values by dividing the count for a particular term by the total value at its parent node. Preferably, a smoothing constant is added to each parent total to avoid unreasonably high estimates for sparse events. The higher the value chosen for the constant, the more slowly the probabilities from the user specific language model will increase (because the probability for a particular term is determined by dividing its count by the value of its parent node). In a preferred embodiment, a smoothing constant of 500 is chosen. However, it will be appreciated that the value of the smoothing constant is a matter of choice.

The advantage of the dynamic language model structure is that it allows rapid updating. However, the disadvantage of this type of language model is that its memory and computational requirements are significantly higher than in its static counterpart.

As stated previously, each language model has two input feeds, the current word input 11 and the context input 12, where the current word input 11 can be used to generate a KeyPress Vector 31. In order to generate a single set of predictions 20 for a given language model, the language model must compute the intersection of the set of candidates returned by the approximate trie 13 and optional candidate filter 15, and that returned by the n-gram map 14. Alternatively, the language model must compute the intersection of the set of candidates returned by the probabilistic trie 33 and that returned by the n-gram map 14. A set of candidates is represented by a set of numerical identifiers.

To compute the intersection of the set of candidates returned by the approximate trie and the n-gram map, an intersection mechanism 16 first determines which of the two sets is smaller. The smaller set of identifiers is used as a base set. The mechanism 16 iterates through the base set of identifiers and looks up each identifier in the base set in the other set. If a match is found for the identifier in question, the intersection mechanism 16 places the identifier in a new set which represents the intersection between the two sets. In this embodiment, the probability associated with an identifier in the new set is its probability as stored in the n-gram map. This is because the candidates returned from the approximate trie do not have a probability value associated with them. The approximate trie is interrogated to return possible candidates only. To compute the intersection of the set of candidates returned by the probabilistic trie 33 and then-gram map, the intersection mechanism 16 follows the same procedure as set out with relation to the approximate tri 13. However, in the case of the probabilistic tri 33, the candidates returned from the probabilistic tri 33 will have a probability value associated with them. Therefore, if a match is found between the candidates returned from the n-gram map and those returned from the probabilistic trie 33, the intersection mechanism 16 computes the product of the two probabilities and places the identifier, mapped to its resultant probability, in a new set which represents the intersection between the two sets.

The language model can be configured to apply one or more filters to the predictions generated by the intersection mechanism 16. In one embodiment, the first filter that is applied is a bloom filter 17, which is followed by a topic filter 18 and optionally additional filters 19 to generate the output predictions 20 for a given language model. However, in other embodiments the ordering of the applied filters or the types of applied filter can be changed.

A Bloom filter 17 is a randomised data structure used to store sets of objects in a highly efficient manner using bit-arrays and combinations of hash functions. The present system uses an implementation of a multi-bit-array Bloom filter 17 to reorder prediction candidates, generated at the intersection 16, on the basis of higher-order n-gram statistics which for memory reasons cannot be stored in the n-gram map 14. The present system utilises a technique for associating n-grams 14 with probability values in the Bloom filter 17. A technique to associate Bloom filter entries with probability values is disclosed in Talbot and Osborne, 2007, *Proceedings of the* 2007 *Joint Conference on Empirical Methods in Natural Language Processing and Computational Natural Language Learning,* pp. 468-479.

For a given set of prediction candidates and a certain number of context terms, the Bloom filter 17 reorders the predictions to reflect new probabilities. The present system utilises a log-frequency Bloom filter (Talbot and Osborne) which maps a set of n-gram entries to respective probability estimates. In the present system, the language model generates a set of predictions P based on a set of up to n−1 context terms C. A log-frequency Bloom filter F, which associates n+1-gram term sequences with probability estimates, can be used to generate a new prediction set in which the previous predictions are reordered. For each term prediction t in P, the language model is configured to search F based on a context of c+C+t to yield a new probability value v, wherein C comprises the n−1 terms of preceding text input used to search the n-gram map; t comprises the term predictions in P (those in the determined intersection); and c comprises an extra term of context, immediately preceding the n−1 terms used to search the n-gram map. Therefore, the n+1-gram map of the Bloom filter is searched for each n+1 term sequence, c+C+t, to determine whether that n+1-gram path exists and, if so, the probability associated with that path. A new prediction set is then constructed using the new probabilities. In general, if p is the final number of predictions requested, then the filtering process will operate on a number greater than p (specified a-priori) so that the reordering process may result in a different set of predictions returned to the user.

In some embodiments, the language model can be further configured to apply a topic filter 18. N-gram statistics yield estimates of prediction candidate probabilities based on local context, but global context also affects candidate probabilities. The present system utilises a topic filter 18 that actively identifies the most likely topic for a given piece of writing and reorders the candidate predictions accordingly.

The topic filter 18 takes into account the fact that topical context affects term usage. For instance, given the sequence "was awarded a", the likelihood of the following term being either "penalty" or "grant" is highly dependent on whether the topic of discussion is 'football' or 'finance'. Local n-gram context often cannot shed light on this, whilst a topic filter that takes the whole of a segment of text into account might be able to.

The function of the topic filter is to accept a set of predictions and yield a variant of this set in which the probability values associated with the predicted terms may be altered, which may consequentially alter the ordering of predictions in the set. Given an input prediction set P and current input text T, the topic filter carries out the following operations: predict a weighted set of categories representing the most probable topics represented in T; predict a weighted set of topic categories for the terms/phrases in P; and modify P such that the probabilities of predictions with similar topic categories to T are inflated relative to those with dissimilar topic categories.

The prediction of topic categories for an arbitrary segment of text is accomplished through the machine learning paradigm of classification, which consists of a framework within which a mechanical 'learner' induces a functional mapping between elements drawn from a particular sample space and a set of designated target classes (see B. Medlock, "*Investigating Classification for Natural Language Processing Tasks*", VDM Verlag 2008, for a more detailed introduction to classification concepts and methods).

A classifier is employed in the topic filter 18 based on the principle of supervised learning in which a quantity of training data must first be collected and assigned labels representing topic categories. From this data, the classifier learns to infer likely topic category labels for new data. In the present case, an individual data sample is a segment of text. For instance, when building a classifier to label data in the news domain, a collection of news stories is required where each is pre-assigned topic category labels representing its dominant topic(s), e.g. 'sport', 'finance', 'entertainment' etc. The set of topic categories is pre-defined, and may be hierarchical, e.g. 'football' might be a subcategory of 'sport'.

Once the classifier has been trained on pre-existing data, it is able to predict the most likely topic categories for a new segment of text, along with a numerical value for each prediction representing the degree of confidence with which the prediction has been made. For example, given the following text segment, "David Beckham will stay at AC Milan until the end of the season after a 'timeshare' deal was finally agreed with Los Angeles Galaxy", a trained classifier might yield the following category predictions 'sport'→0.8; 'finance'→0.3, wherein the numerical values represent the confidence that the classifier has in that particular prediction. The numerical values can be interpreted as an estimate of the level of representation of that particular topic in the given text segment.

The prediction of topic categories for individual terms/phrases from the prediction set P can be carried out in the same manner as for input text segments, using the classifier. This yields a set of weighted topic category predictions for each term/phrase prediction in P.

The modification of prediction probabilities in P requires the definition of a 'similarity metric' between topic category prediction sets. This takes the functional form: sim(S, S')=v, where S and S' are topic category prediction sets and v is the real-valued output from the function sim, representing the degree of similarity between S and S'. There are many different methods of implementing sim and any one is appropriate. For instance, the topic category prediction sets can be interpreted as vectors in an m-dimensional space where m is the number of topic categories. Under this interpretation, the weight assigned by the classifier to a particular category c is the extension of the vector in the c-dimension. Well-established techniques can be used for estimating vector similarity, e.g. by applying magnitude normalisation and taking the inner (dot) product.

Once the similarity metric has been defined, the final stage within the topic filter 18 is to use the similarity values to modify the probabilities in P. A number of techniques can be chosen for accomplishing this, but one possibility is to inflate the probabilities in P by a small value in inverse proportion to their rank when ordered by topic similarity with T, for instance in accordance with the formula, $P_{final}=P_{initial}+k/r$, where p is the prediction probability drawn from P; r is the rank of the term associated with p, when ordered by sim($S_p$, $S_T$) (rank 1=highest similarity); and k is a pre-defined constant.

The language model architecture of the present system is configured such that any number of additional filters 19 can used to reorder candidate probabilities. At each stage, the language model will already possess a candidate prediction set, and if a threshold on computation time is exceeded, the candidate set can be returned and additional filters 19 can be easily bypassed.

The language model returns its predictions 20 as a set of terms/phrases mapped to probability values. As explained in the discussion of FIG. 1, the output predictions 20 from each language model are aggregated by the multi-LM 8 to generate thermal set of predictions 10 that are provided to a user interface for display and user selection.

From FIGS. 2*a-d*, it can be seen that in the absence of a current word input 11, and therefore the absence of a KeypressVector 31 also, the predictions are based on a context input only 12.

In some embodiments, the system can use beginning of sequence markers to generate a list of word or phrase predictions 9 in the absence of any preceding user input, enabling a user to select a word or phrase to commence the input of a sentence. The system can also use "beginning-of-sequence" (BOS) markers to determine word or phrase predictions after end-of-sentence punctuation and/or after new line entry.

The language models use BOS markers which are used as context 12 in the absence of any preceding user input. In the absence of preceding user input, the language models will generate certain terms such as "Hi", "Dear", "How", "I" etc. because they are more likely than high probability unigram terms such as "of", "to", "a" etc. The predictions from each language model 20 are based on BOS markers. One of the entries in the first level of the n-gram map will be the BOS marker, and this will be used as context in exactly the same way as standard input terms, e.g. if the BOS marker is w then then-gram map might contain (amongst others) the following paths: "^ Dear"→0.2; "^ Hi"→0.25; "^ How"→0.1; and "^ I"→0.15. Preferably, BOS markers are automatically inserted into the context when a user enters end-of-sentence punctuation (period, exclamation mark, question mark) or enters the 'return' character.

As the user specific language model 7 is a dynamic language model, over time it will learn a user's language style, thereby generating predictions that are more likely to reflect a particular user's language style. However, if the text prediction engine generates a list of word or phrase predictions 9 which fails to include the word desired by the user, the user can tailor the list of words or phrases generated by the text prediction engine by inputting a character 11 through the user interface. The language model then utilises an approximate trie 13 or a probabilistic trie 33, along with an n-gram map, to generate a list of word predictions based on the current word input 11.

As stated previously, with reference to FIG. 1, the present system utilises a mechanism 5, static pruning, across all static language models, to reduce the amount of information stored in the system. In the following section static pruning is described in relation to the pruning of a single language model.

Given two language models L1 and L2, the pruning of L1 is achieved by comparison to a reference language model, L2. Each language model comprises an n-gram map, in which terms in the vocabulary are associated with numerical identifiers which are stored in the map and associated with probability values. Because identifiers are assigned to terms such that the resulting ordering is from most-to-least frequent, the identifier that is assigned to a given term in one language model does not necessarily match the identifier assigned to the same term in a different language model. Therefore, to achieve static pruning, the static pruning mechanism 5 generates a conversion table between the vocabulary identifiers in L1 and the vocabulary identifiers in L2. The conversion table maps the identifier for a given term t in L1, to the identifier for the term t in L2. For example, if the term "the" is identified by the numerical identifier 1 in L1 and the identifier 2 in L2, then given the identifier 1 for L1, the conversion table will yield the identifier 2 for L2.

The static pruning mechanism 5 traverses the n-gram map of L1 such that each node is visited exactly once. For each path followed in L1, the corresponding path is attempted in L2 by using the conversion table to convert the path identifiers in L1 to those of L2. The static pruning mechanism 5 conducts a binary search to locate specified subsequent child nodes. For example, if the context comprises term1 and term2, the static pruning mechanism 5 will first locate the node for term1. Term2 is then the specified child node that will be searched for. By conducting such a search in L2, identical paths can be identified. If no identical path exists in L2, the static pruning mechanism 5 moves on to search in L2 for the next path of L1. If an identical path exists in L2, then the static pruning mechanism 5 makes a comparison of the probabilities at each node. If the L1 probability is smaller than the L2 probability, and the node is terminal, then the static pruning mechanism 5 removes this node from L1.

Figure 7:
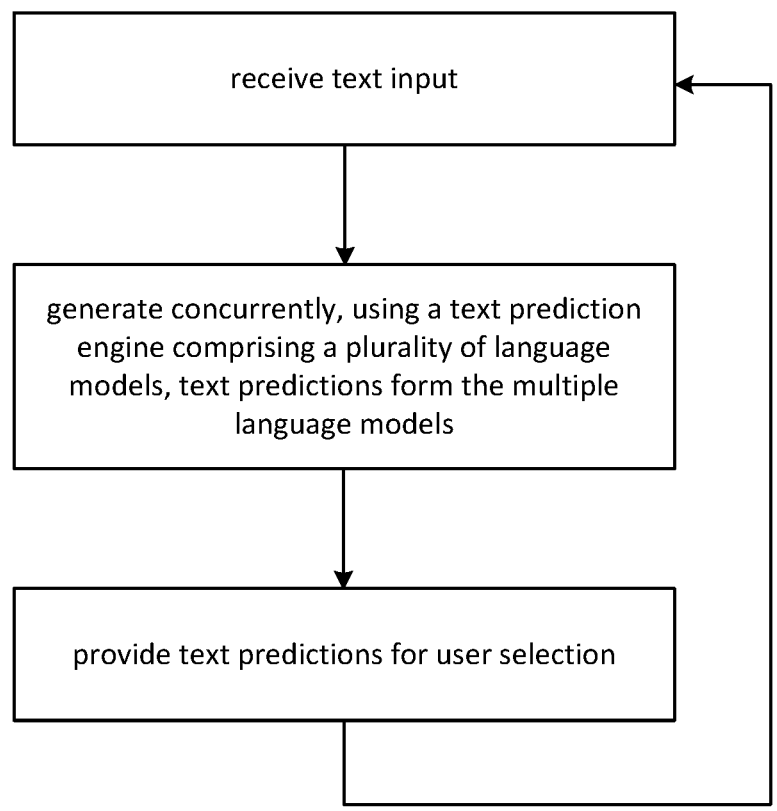
FIG. 7 is a flow chart of a method for processing user text input and generating text predictions for user selection according to the invention.

A method according to the present invention is now described with reference to FIG. 7 which is a flow chart of a method for processing user text input and generating text predictions. In the particular method described, the first step comprises receipt of text input. Analogous to the foregoing discussion of the system according to the present invention, the text input can comprise current word input 11 (which can be represented by a KeyPress Vector 31) and/or context input 12. Therefore, the input stream can comprise character, word and/or phrase inputs and/or punctuation inputs. In embodiments where the predictive text engine also predicts punctuation, the punctuation items are stored in then-gram maps with the text terms. Single punctuation items ('!', '?') and blocks of punctuation ('!!!!!!!', ' . . . ') are handled as single prediction units.

The method further comprises the steps of generating concurrently, using a text prediction engine comprising a plurality of language models, text predictions from the multiple language models; and providing text predictions for user selection. As shown in the flow chart of FIG. 7, a loop is formed when a user inputs a sequence because this sequence, which may include terms selected from previous prediction sets, is used to update the dynamic language model which contributes to the next set of predictions 9. The loop is formed by the insertion of an end-of-sequence punctuation mark, or a 'return' keypress for example. Hence, predictions are constantly updated based upon previous sequence inputs.

By way of an example, say a user has already entered the sequence "Hope to see you" and is intending to enter the terms "very" and "soon" in that order. The final prediction set 9 that is provided by the text prediction engine 100 to a user interface for display and user selection, may comprise 'all', 'soon', 'there', 'at', 'on', 'in'.

The intended next term "very" is not in the currently-predicted list of terms. The user can enter multi-character 'v/x/z' input to prompt the predictive text engine 100 to provide more relevant predictions. The information about the current context "Hope to see you" and the currently-entered multi-character 'v/x/z' is passed to the text prediction engine 100 where the Multi-LM 8 tokenises the context and adds the beginning-of-sequence marker '^': "Hope to see you"→"^" "Hope" "to" "see" "you".

The Multi-LM 8 then passes the tokenised sequence data 12 and the multi-character current input 11 to each of the language models. Each language model receives a copy of the current input 11 and the tokenised context 12.

Within each language model, the current input (which may be represented as a KeyPress Vector 31) is fed into the approximate trie 13 or the probabilistic trie 33, which in this case returns the set of identifiers for all vocabulary terms that begin with either 'v' or 'x' or 'z'. It accomplishes this by following the initial paths to the nodes corresponding to the characters 'v', 'x' and 'z', concatenating the identifier value sets found at each node and returning the combined set. In the case of the identifiers being returned by an approximate trie 13, the set of identifiers can be narrowed using a candidate filter 15. However, in the present example, no filtering is required because the length of the current input will be less than the maximum depth of the approximate trie. Candidate filtering is only necessary when using an approximate trie 13 and even then, only when the length of the current input exceeds the maximum depth of the approximate trie, which as noted previously, to be of any use, must be at least 1, and usually around 3-5. The depth of the approximate trie is specified a-priori for each language model.

Using the tokenised context 12, then-gram map 14 is queried by the language model for a given n-gram order, i.e. a number of context terms. Each language model contains n-grams up to a maximum value of n. For example, a particular language model may contain 1, 2 and 3-grams, in which the maximum n-gram order would be 3. The system begins by taking the largest possible amount of context and querying the n-gram map to see if there is an entry for the path representing that context. So, for example, if a given language model has a maximum n-gram order of 3, in the present example, the system would begin by searching for the path corresponding to the context phrase "see you". The system then extracts the first k children of the node corresponding to this path, where k is an a-priori parameter of the system. In static language models, each child node contains a term identifier and a compressed probability value that can be extracted directly for use in prediction ordering. In dynamic language models, the node contains a frequency value which must be normalised by its parent 'total' value to yield a probability.

Given a set of identifiers from the approximate trie 13 or set of identifiers mapped to probability values from the probabilistic trie 33, and a set of identifiers mapped to probability values from the n-gram map 14, the intersection is computed by an intersection mechanism 16. If the number of predictions in the resulting set is less than p, or some multiple of p (where p is the required number of predictions), the system continues to look for further predictions by returning to the n-gram map 14 and considering smaller contexts. In this example, if the context "see you" did not yield enough predictions, the system would consider the context "you" (second level in the n-gram map), and if that still did not yield the required number, the system would revert to an empty context (first level in then-gram map).

In the present example, the system has previously searched for the path corresponding to the context phrase "see you". At this stage, the language model has obtained a set of predicted terms which are compatible with the context and the current input (which may be represented by a KeyPressVector 31), ordered by their respective probability values, as extracted from the n-gram map. For example, the prediction set may comprise the identifiers corresponding to the terms "very", "visit" and "x". A new prediction set is generated, with the previous predictions re-ordered, by using the Bloom filter component 17. In this case, the Bloom filter might contain 4-gram sequences associated with probability estimates. The language model would query the Bloom filter using a new context comprising the previous context used to search the n-gram map ("see you"), the set of current predictions ("very", "visit" and "x"), and optionally, an extra context term (in this case "to"). Hence, in this example, the Bloom filter would be queried using the following sequences: "to see you very"; "to see you visit"; and "to see you x".

The probabilities mapped to the terms "very", "visit" and "x" in the current prediction set would then be replaced by the values returned from the Bloom filter and consequentially reordered. Additional filters would operate in a similar manner. In general, if p is the final number of predictions requested, then the filtering process would operate on a number greater than p (specified a-priori), such that the reordering process may result in a different set of predictions returned to the user.

Once all filters have been applied, a set of predictions (terms+probability values) 20 is returned by each individual language model to the Multi-LM 8, which then aggregates them by inserting all predictions into an ordered associative structure, or an STL multimap, and choosing the p most probable and returning them as the final prediction set 9. In our example, the prediction set 9 presented to the user might be 'very', 'via', 'visit', 'view', 'x'.

The intended term "very" now appears on the prediction list and can be selected. Once selected, the context, now including the term "very", becomes "Hope to see you very" and the current input is empty. The preceding method steps are iterated in the same manner, except that this time the approximate trie or the probabilistic trie is bypassed (because there has been no character entry, i.e. no current word input), and the prediction candidate set is drawn solely from the n-gram map. This might yield the following prediction set 'much', 'soon', 'good', 'many', 'well'.

The term "soon" occurs in the prediction set, so the user can select it, and once again the context is updated, this time to include the new term, "Hope to see you very soon", and the current input is set to empty. This process continues to iterate as input progresses.

When the user ends a sequence by pressing 'return' or an end-of-sequence punctuation term, the user interface is configured to pass the current sequence to the text prediction engine 100, wherein the Multi-LM 8 is configured to 'tokenise' the current sequence which it then passes to the user specific language model 7. The dynamic language model 7 assigns numerical identifiers to the tokenised input 12 and updates the n-gram map 14. Using the same example, consider that the user subsequently adds an exclamation mark at the end of the sequence to yield: "Hope to see you very soon!" The following stages would occur: The Multi-LM 8 tokenises the sequence and inserts the BOS marker, "Hope to see you very soon!" becomes, for example, "^" "Hope" "to" "see" "you" "very" "soon" "!"; and for each term in the sequence (and its respective context), the dynamic language model adds n-gram paths to the dynamic ngram map constituting varying context lengths, from no context to n–1 terms of context, where n is the maximum n-gram order for the language model. For instance in the case of the above example, assuming n=4, the following paths would be added:

"^"
"Hope"
"^" "Hope"
"to"
"Hope" "to"
"see"
"to" "see"
"Hope" "to" "see"
"^" "Hope" "to" "see"
"you"
"see" you
"to" "see" "you"
"Hope" "to" "see" "you"
"^" "Hope" "to" "see" "you"
"very"
"you" "very"
"see" "you" "very"
"to" "see" "you" "very"
"soon"
"very" "soon"
"you" "very" "soon"
"see" "you" "very" "soon"
"!"
"soon" "!"
"very" "soon" "!"
"you" "very" "soon" "!"

For each n-gram path, the dynamic language model 7 increments the frequency value of the corresponding node by one, and also increments the total value for the parent by one. If a given term does not exist in the dynamic language model vocabulary, it is added by the language model, and assigned a new identifier.

Figure 8:
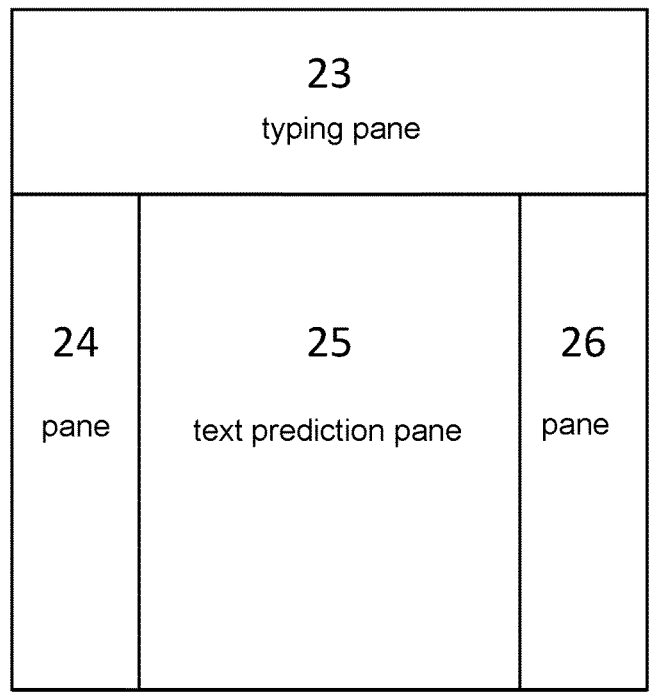
FIG. 8 is a schematic of the user interface according to the invention.
Figure 8A:
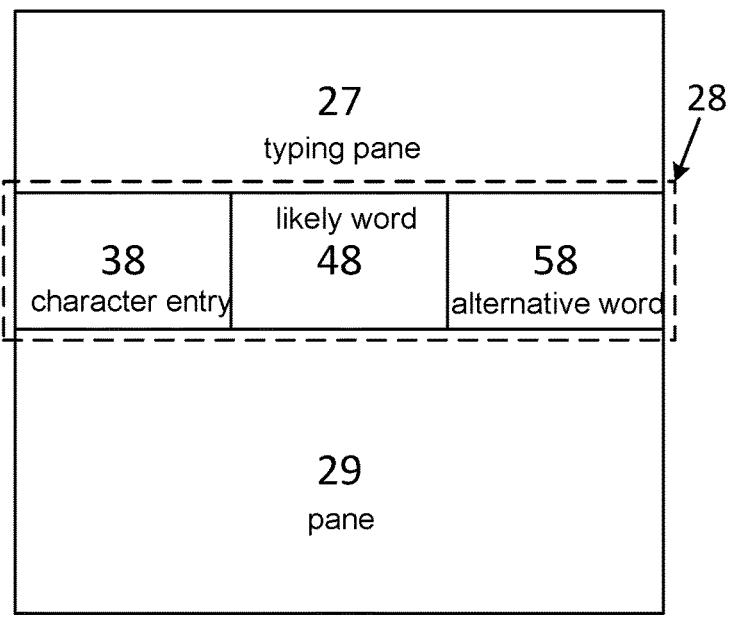
FIG. 8a is a schematic of an alternative user interface according to the invention.

The present invention also relates to a user interface. In particular it relates to a touch-screen interface, through which the system of the present invention can be operated. FIG. 8 provides a schematic representation of a generic user interface. FIG. 8a provides a schematic of an alternative generic user interface. As shown in FIG. 8, the basic user interface comprises a typing pane 23, a text prediction pane 25 which may be located centrally for example and two identical panes, which may be located to the sides, for single/multi character, punctuation or symbol entry 24, 26. In the alternative embodiment, as shown in FIG. 8a, the basic user interface comprises a typing pane 27, a prediction pane 28 and a single pane for single/multi character, punctuation or symbol entry 29. The prediction pane 28 preferably comprises an actual character entry button 38, a most likely word button 48 and an alternative word button 58.

In the embodiment according to FIG. 8, the prediction pane 25 comprises a set of buttons, each button displaying a word from a set of words or phrases that has been predicted by a text prediction engine. The typing pane 23 comprises a pane in which user inputted text is displayed. The side panes 24, 26 can comprise a set of buttons corresponding to character, punctuation or numeral keys. In the case of the default screen, the side panes 24, 26 comprise character buttons. However, in other configurations panes 24, 25, 26 are all used for character, punctuation and numeral buttons, and the screens are toggled so that a user can move between prediction, numeral and punctuation screens.

The difference between the two user interface embodiments is in the prediction pane 25, 28. In the alternative embodiment, the prediction pane 28 comprises an actual character entry button 38 which enables a user to input the sequence of characters they have typed into the system (rather than entering a word that has been predicted by a text prediction engine of the system). This enables the user to input words which are not recognised by the system and which would not therefore be predicted by the system. The prediction pane 28 also comprises a most likely word button 48 which displays the word with the greatest probability associated with it from a set of words or phrases predicted by a text prediction engine. The prediction pane 28 also comprises an alternative word button 58 which displays a word other than the word with the highest probability (i.e. the word with the second highest probability). Pressing either of the buttons 48 and 58 will cause the associated word to be entered.

In both embodiments of the user interface, the typing pane 23 displays the text entered by a user. A user is able to scroll up or down previously typed text which is displayed in the typing pane, enabling the user to view and edit the text. The typing pane can also comprise a cursor which can be moved to facilitate the editing of the entered text.

The interface is arranged such that when a word button from the prediction pane 25, 28 is pressed, that word is selected and appears in the typing pane 23, 27. The updated input sequence comprising the selected word and its preceding context is passed to the text prediction engine for new prediction generation. Preferably, in the embodiment of FIG. 8*a*, the user enters the most likely word by pressing the most likely word button 48 or by entering a space.

In the embodiment of FIG. 8, when a word button is held (for a specified amount of time) or in response to a left-to-right gesture, the current input sequence, excluding the term in question, is passed to the text prediction engine, and the word is displayed in the 'typing pane'. The word is not completed (i.e. a space is not automatically entered after the word), but the letters are used as input for further prediction. For example, if the word 'not' is held, then the text prediction engine generates a list of word predictions 9 including for example 'note', 'nothing', etc., which is provided to the user interface for display and selection in the prediction pane 25. If the language model predicts punctuation, the punctuation terms appear in the same location as the predicted words or phrases, at the bottom of the prediction pane 25, thereby providing the user with consistency. In the alternative user interface of FIG. 8*a*, the current input sequence is displayed in the typing pane 27 in real time. The actual character entry button 38 also displays the current input sequence, and this is shown alongside the current most likely word button 48 and the alternative word prediction 58. If the user wishes to select the input sequence they have entered, rather than a predicted term, the user presses the actual character entry button 3 8 to enter this inputted sequence as a finished word.

The user interface of FIG. 8 can be configured for multiple word (phrase) input. An example of two-term phrase input is discussed in relation to a predicted phrase of "and the". In the central prediction pane 25, a button containing the word "and" will be displayed next to, and to the left of, a button containing the word "the". If the user selects the term "the", the sequence "and the" is entered. However, if the user selects "and", only "and" is entered. The same principle can be applied to arbitrary length phrase prediction. The same principle can be applied to the user interface of FIG. 8*a*, where the most likely word button 48 can be configured to display a phrase input. For example, the most likely word button 48 can be divided into two or more buttons if the most likely prediction is a two or more term phrase, and the alternative word button 58 can show the next most likely phrase prediction.

Character buttons can be displayed in the two side panes 24, 26 or a single main pane 29. The character buttons can have dual or tri character behaviour. This means that either two or three characters are submitted concurrently to the predictor (e.g. if an 'A|B' button is pressed then 'A' and 'B' are submitted). In an embodiment this is the default behaviour on the default screen. The dual character buttons are designed with multi-region behaviour. For instance, pressing the left side of the 'A|B' key will input 'A', the middle region will give both 'A' and 'B', the right side will input 'B' (this combines the benefit of larger, more accessible multi-character buttons, whilst at the same time allowing experienced users the benefit of higher prediction accuracy resulting from single character input). In an embodiment this is optional behaviour on the default screen. Multi tap is used when it is necessary to type characters unambiguously (e.g. for entry of a new word that is not in the language model vocabulary). In an embodiment to enter characters unambiguously, a user presses a toggle button to go to a numbers/punctuation screen where all buttons are multitap.

For numbers or punctuation, all buttons are multitap. For example, with tricharacter buttons, the user can press once to enter the first term (of the three term button), press twice to enter the second term, or press three times for the third term to be entered.

The interface can also comprise one or all of the following additional features: a menu button which toggles the screen between prediction, numbers and punctuation, and further punctuation screens; a return button to start a new line of text; a space button to enter a space when pressed or repeatedly enter a space when held; a delete button to delete individual characters when singularly pressed or repeatedly delete characters or words when held; a capitalisation button which toggles between Abc (where only the first letter is capitalised), ABC (all letters capital) and abc (all letters lower case); a send button to send the inputted text as an email (this is specific to an email focused application).

Furthermore, the interface can optionally include an 'undo' button or it can be configured to be responsive to an 'undo' gesture, which is a gesture on a delete button (e.g. movement from left to right). In response to this gesture, or button press, the interface undoes the previous term selection, placing the user back at the position prior to term selection.

For example, if a user has entered 'us' by character input, they will be presented with a selection of word predictions based on this input. In an example where they accidentally select the word "usually" rather than the intended word "useful", the undo gesture allows a user to undo the word selection and return to the original predictions based on 'us', thereby enabling them to select 'useful'. This saves the user from repeatedly pressing the delete button to remove the characters accidentally entered by the incorrect word selection.

The current system includes automatic capitalisation at the beginning of sentences. However, toggling the ABC, Abc and abc options means that the language model will only predict words of the correct form, i.e. if the capitalisation toggle key is set to Abc, the prediction engine will search for terms that follow this capitalization scheme, e.g. 'Jon' 'Ben' 'Cambridge' etc.

It will be appreciated that this description is by way of example only; alterations and modifications may be made to the described embodiment without departing from the scope of the invention as defined in the claims.

What is claimed:

1. A system comprising:
   a user interface;
   a processor; and
   memory storing instructions that, when executed by the processor, cause the system to perform operations comprising:
   receive text input corresponding to a sequence of one or more input characters;
   generate text predictions based on the received text input using a plurality of different language models, the text predictions comprising a term and an associated probability;
   prune the plurality of different language models by comparing a first sequence of terms stored in one language model among the plurality of different language models to a second sequence of terms stored in one or more other language models among the plurality of different language models and removing one of the first or second sequence of terms when the first and second sequence of terms are duplicates;
   receive additional text input;
   provide updated text predictions based on the pruned plurality of different language models;
   insert the updated text predictions into an ordered associative structure or a multi-map structure; and
   return one or more probable terms of the updated text predictions for provision to the user interface.

2. The system of claim 1, wherein the text predictions are generated from the plurality of different language models at the same time.

3. The system of claim 1, wherein the plurality of different language models comprises one or more of a human language model, a static language model, a dynamic language model, an application language model, a community language model, an email language model, an SMS language model, a newswire language model, an academic paper language model, a blog language model, a product review language model, a local dialect language model, an interest group language model, a word processing language model, a patents language model, a company language model, a user community language model, and a user language model.

4. The system of claim 1, wherein the plurality of different language models language using an approximate or probabilistic trie, and an n-gram map, wherein the approximate or probabilistic trie is an extension of a standard trie, with a set of values stored at nodes for all subsequently allowable character sequences.

5. The system of claim 4, wherein the plurality of different language models is configured to conduct a search of the n-gram map to determine word or phrase predictions for a next term based on n−1 terms of preceding text input.

6. The system of claim 5, wherein the plurality of different language models comprise a mechanism to compute an intersection of the predictions determined by the approximate or probabilistic trie, and the n-gram map, by searching for and retaining only identifiers that are present in the predictions.

7. The system of claim 6, wherein the plurality of different language models further comprise a Bloom filter, comprising an n+1 gram map, which is configured to search the n+1 gram map to return a new text prediction set based on a context of:
   the n−1 terms of preceding text input used to search the n-gram map;
   the prediction terms in the intersection; and
   an extra term of context, immediately preceding the n−1 terms used to search the n-gram map.

8. The system of claim 7, further comprising a user interface that comprises:
   a single or multi-character entry mechanism;
   a word prediction pane; and
   a typing pane to display inputted text.

9. The system of claim 8, further comprising a button, the user interface configured to undo a previous word selection in response to a press of the button or in response to a left-to-right gesture on the button.

10. The system of claim 8, wherein the word prediction pane is touch-sensitive and includes one or more word keys to present predicted words and wherein, in response to a word key press selecting a word, the user interface is configured to display the word in the typing pane and pass a current input sequence including the word as context input.

11. The system of claim 8, wherein the word prediction pane is touch-sensitive and includes one or more word keys to present predicted words and wherein, in response to a word key press and hold or left-to-right gesture on the word key to select a word, the user interface is configured to display the word in the typing pane, pass a current input sequence excluding that word as context input, and pass characters of that word as current term input.

12. The system of claim 8, wherein the word prediction pane is touch-sensitive and includes one or more word keys to present predicted words and wherein, in response to a word key press selecting a word, the user interface is configured to display the word in the typing pane and pass a current input sequence including the word as context input.

13. The system of claim 8, wherein the word prediction pane is touch-sensitive and includes one or more word keys to present predicted words and wherein, in response to a word key press and hold or left-to-right gesture on the word key to select a word, the user interface is configured to display the word in the typing pane, pass a current input sequence excluding that word as context input, and pass characters of that word as current term input.

14. The system of claim 5, wherein a punctuation item is stored in the n-gram map with the next term.

15. A method for processing user text input and generating text predictions, comprising:
   receiving text input corresponding to a sequence of one or more input characters;
   generating, using a plurality of different language models, a plurality of text predictions, based the received text input, wherein the plurality of text predictions comprise at least a term and an associated probability;
   update the plurality of text predictions by updating the language models and comparing a first sequence of terms stored in one of the plurality of different language models to a second sequence of terms stored in another of the language models and removing one of the first or second sequence of terms when the first and second sequence of terms are duplicate or multiple entries;

receiving additional text input;

providing the updated plurality of text predictions based on the updated language models;

insert the updated plurality of text predictions into an ordered associative structure or a multi-map structure; and return one or more probable terms of the updated plurality of text predictions for provision to a user interface.

16. The method of claim 15, wherein the plurality of different language models comprise an n-gram map, and an approximate or probabilistic trie, the method further comprising conducting a search of the n-gram map to determine word or phrase predictions for a next term based on up to n−1 terms of preceding text input.

17. The method of claim 16, wherein the different language models comprise a mechanism to compute an intersection of the word or phrase predictions determined by the approximate or probabilistic trie, and the n-gram map, the method further comprising computing the intersection of the word or phrase predictions.

18. The method of claim 15, wherein a punctuation item is stored in an n-gram map with the next term.

19. A computer readable memory product having stored thereon a computer program including instructions that, when executed on a processor, configure a computing device to:

receive text input corresponding to a sequence of one or more input characters input;

generate text predictions based on the received text input using a plurality of different language models, the text predictions comprising a term and an associated probability;

update the text predictions by updating the language models and comparing a first sequence of terms stored in one language model among the plurality of different language models to a second sequence of terms stored in one or more other language models among the plurality of different language models and removing one of the first or second sequence of terms when the first and second sequence of terms are duplicates;

receive additional text input;

provide the updated text predictions based on the updated language models;

insert the updated text predictions into an ordered associative structure or a multi-map structure; and return one or more probable terms of the updated text predictions for provision to a user interface.

* * * * *